United States Patent
Wang et al.

(10) Patent No.: US 12,028,877 B2
(45) Date of Patent: Jul. 2, 2024

(54) ACQUISITION OF SYSTEM INFORMATION

(71) Applicant: QUALCOMM Incorporated, San Diego, CA (US)

(72) Inventors: Shanshan Wang, San Diego, CA (US); Karthik Venkatram, San Diego, CA (US); Yongle Wu, San Diego, CA (US); Daniel Amerga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 231 days.

(21) Appl. No.: 17/187,673

(22) Filed: Feb. 26, 2021

(65) Prior Publication Data

US 2021/0274468 A1 Sep. 2, 2021

Related U.S. Application Data

(60) Provisional application No. 62/983,490, filed on Feb. 28, 2020.

(51) Int. Cl.
| | |
|---|---|
| *H04W 72/00* | (2023.01) |
| *H04W 24/08* | (2009.01) |
| *H04W 36/00* | (2009.01) |
| *H04W 36/08* | (2009.01) |
| *H04W 68/00* | (2009.01) |
| *H04W 72/30* | (2023.01) |

(Continued)

(52) U.S. Cl.
CPC ............ *H04W 72/30* (2023.01); *H04W 24/08* (2013.01); *H04W 36/0079* (2018.08); *H04W 36/08* (2013.01); *H04W 68/005* (2013.01); *H04W 72/53* (2023.01); *H04W 76/28* (2018.02)

(58) Field of Classification Search
None
See application file for complete search history.

(56) References Cited

U.S. PATENT DOCUMENTS

| | | | |
|---|---|---|---|
| 2006/0128392 A1* | 6/2006 | Turina | H04W 48/06 455/452.1 |
| 2010/0172297 A1* | 7/2010 | Amerga | H04W 48/16 370/328 |

(Continued)

OTHER PUBLICATIONS

3GPP (ETSI TS 138 331 V15.5.1 (May 2019) (Year: 2019).*
ETSI TS 138 133 V15.4.0 (Apr. 2019) (Year: 2019).*

*Primary Examiner* — Alex Skripnikov
*Assistant Examiner* — Pamit Kaur
(74) *Attorney, Agent, or Firm* — Loza & Loza LLP

(57) ABSTRACT

Various aspects relate to acquisition of system information (SI). In some examples, a UE uses a guard timer to control how long the UE attempts to acquire a particular type of SI. In some examples, a UE that has entered a cell may determine whether there are any remaining paging occasions (e.g., that may indicate an SI update) during a period of time. If there is an insufficient number of paging occasions remaining (e.g., zero or one), the UE may monitor for broadcast SI. In some examples, after sending a request for SI to a base station, a UE may also periodically monitor for SI broadcast by the base station (e.g., to avoid potential delays in obtaining the SI). In some examples, if a UE does not acquire SI, the UE may use default SIB information (e.g., that expedites reselection to another cell).

20 Claims, 22 Drawing Sheets

(51) Int. Cl.
*H04W 72/53* (2023.01)
*H04W 76/28* (2018.01)

(56) References Cited

U.S. PATENT DOCUMENTS

| | | | |
|---|---|---|---|
| 2012/0100846 A1* | 4/2012 | Saini | H04W 48/08 |
| | | | 455/424 |
| 2015/0172972 A1* | 6/2015 | Pani | H04W 36/0085 |
| | | | 370/331 |
| 2017/0064764 A1* | 3/2017 | Ke | H04W 48/12 |
| 2019/0349844 A1* | 11/2019 | Ishii | H04W 48/14 |
| 2020/0245224 A1* | 7/2020 | Agiwal | H04W 48/08 |

* cited by examiner

ACQUISITION OF SYSTEM INFORMATION

CROSS-REFERENCE TO RELATED APPLICATIONS

The present application for patent claims priority to and the benefit of U.S. Provisional Application No. 62/983,490, titled "ACQUISITION OF SYSTEM INFORMATION" filed Feb. 28, 2020, and assigned to the assignee hereof and hereby expressly incorporated by reference herein as if fully set forth below in its entirety and for all applicable purposes.

TECHNICAL FIELD

The technology discussed below relates generally to wireless communication and, more particularly, to techniques for acquiring system information (SI).

INTRODUCTION

Next-generation wireless communication systems (e.g., 5GS) may include a 5G core network and a 5G radio access network (RAN), such as a New Radio (NR)-RAN. The NR-RAN supports communication via one or more cells. For example, a wireless communication device such as a user equipment (UE) may access a first cell of a first base station (BS) such as a gNB and/or access a second cell of a second BS.

In 5G New Radio wireless communication networks, a BS may transmit system information (SI) that includes, for example, parameters that a wireless communication device uses to gain access to the network. Examples of SI may include, but are not limited to, a subcarrier spacing, a system frame number, a cell bar indication, a list of common control resource sets, a list of common search spaces, a paging search space, a random access search space, uplink configuration information, neighbor cell information, and cell reselection information.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, the disclosure provides a user equipment that includes a transceiver, a memory, and a processor communicatively coupled to the transceiver and the memory. The processor and the memory may be configured to monitor for first system information via the transceiver. The processor and the memory may also be configured to, after a limit for the monitoring for the first system information has been reached, determine that the first system information was not received, and conduct a failure procedure after the determination that the first system information was not received.

In some examples, the disclosure provides a method for wireless communication at a user equipment. The method may include monitoring for first system information. The method may also include, after a limit for the monitoring for the first system information has been reached, determining that the first system information was not received, and conducting a failure procedure after determining that the first system information was not received.

In some examples, the disclosure provides a user equipment. The user equipment may include means for monitoring for first system information, means for determining, after a limit for the monitoring for the first system information has been reached, that the first system information was not received, and means for conducting a failure procedure after determining that the first system information was not received.

In some examples, the disclosure provides an article of manufacture for use by a user equipment. The article of manufacture may include a computer-readable medium having stored therein instructions executable by one or more processors of the user equipment to monitor for first system information, after a limit for the monitoring for the first system information has been reached, determine that the first system information was not received, and conduct a failure procedure after determining that the first system information was not received.

In some examples, the disclosure provides a user equipment that includes a transceiver, a memory, and a processor communicatively coupled to the transceiver and the memory. The processor and the memory may be configured to send a request for first system information to a base station via the transceiver. The processor and the memory may also be configured to, after the request is sent and prior to receipt of a response to the request, monitor for the first system information from the base station via the transceiver.

In some examples, the disclosure provides a method for wireless communication at a user equipment. The method may include sending a request for first system information to a base station. The method may also include, after sending the request and prior to receiving a response to the request, monitoring for the first system information from the base station.

In some examples, the disclosure provides a user equipment. The user equipment may include means for sending a request for first system information to a base station, and means for monitoring, after sending the request and prior to receiving a response to the request, for the first system information from the base station.

In some examples, the disclosure provides an article of manufacture for use by a user equipment. The article of manufacture may include a computer-readable medium having stored therein instructions executable by one or more processors of the user equipment to send a request for first system information to a base station and, after sending the request and prior to receiving a response to the request, monitoring for the first system information from the base station.

These and other aspects of the disclosure will become more fully understood upon a review of the detailed description, which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

DETAILED DESCRIPTION

Figure 1:
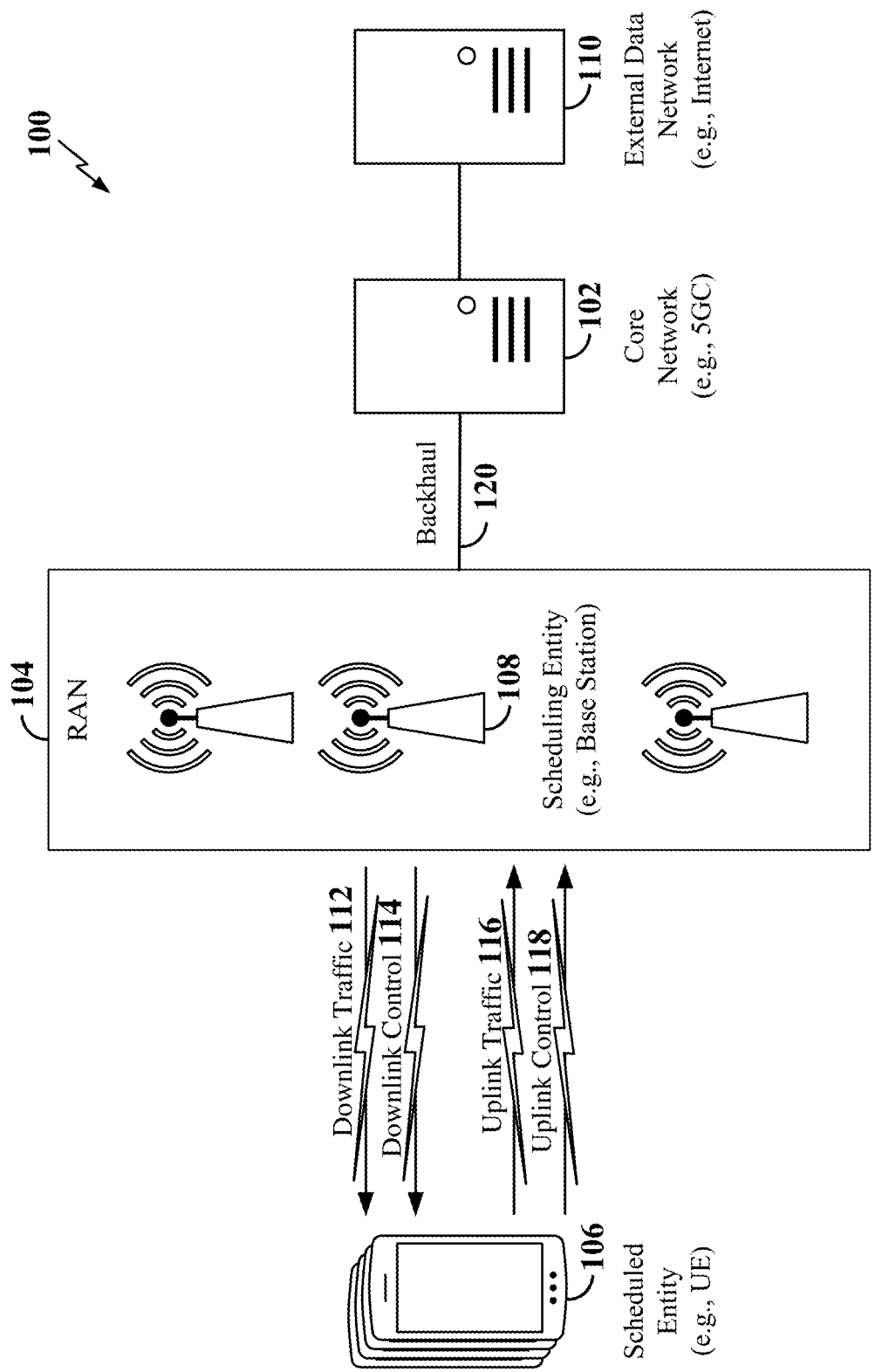
FIG. 1 is a schematic illustration of a wireless communication system according to some aspects

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Various aspects of the disclosure relate to the acquisition of system information (SI). A UE may periodically monitor for SI transmitted by a BS. A UE may also request certain SI from the BS. In some examples, the UE uses a guard timer to monitor how long the UE has been attempting to acquire a particular type of SI. If the guard timer expires, the UE may perform failure handing that is based on the type of the SI. In some examples, a UE that has entered a cell may determine whether there are any remaining paging occasions (e.g., that may indicate an SI update) for the UE during a period of time. If there is an insufficient number of paging occasions remaining (e.g., zero or one), the UE may monitor for broadcast SI. In some examples, after sending a request for SI to a base station, a UE may also periodically monitor for SI broadcast by the base station (e.g., to avoid potential delays in obtaining the SI). In some examples, if a UE does not acquire SI, the UE may use default system information block (SIB) information (e.g., that expedites reselection to another cell).

The disclosure relates in some aspects to a UE that monitors for system information. If the UE determines that the system information is not received prior to a limit for the monitoring being reached, the UE may conduct a failure procedure that is based on a type of the system information.

The disclosure relates in some aspects to a UE that may, upon entering the coverage of a cell of a base station, determine that there are no paging occasions for the UE during a period of time. For example, all of the paging occasions for the UE may have occurred before the UE entered the cell. After making this determination, the UE may monitor for system information.

The disclosure relates in some aspects to a UE that may, upon entering the coverage of a cell of a base station, determine that a quantity of paging occasions remaining for the UE during a period of time is less than or equal to a threshold (e.g., one paging occasion or two paging occasions). After making this determination, the UE may monitor for system information.

The disclosure relates in some aspects to a UE that may send a request for system information to a base station. After sending the request and prior to receiving a response to the request, the UE may monitor for the system information from the base station (e.g., periodically monitor for system information broadcast by the base station).

The disclosure relates in some aspects to a UE that communicates via a first cell of a base station. At some point in time, the UE may determine that it did not acquire system information of the first cell. In response, the UE may set at least one parameter in a system information block to invoke cell reselection to a second cell.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations 108 may be an LTE base station, while another base station may be a 5G NR base station.

The radio access network 104 is further illustrated supporting wireless communication for multiple mobile apparatuses. A mobile apparatus may be referred to as user equipment (UE) 106 in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services. In examples where the RAN 104 operates according to both the LTE and 5G NR standards, the UE 106 may be an Evolved-Universal Terrestrial Radio Access Network—New Radio dual connectivity (EN-DC) UE that is capable of simultaneously connecting to an LTE base station and a NR base station to receive data packets from both the LTE base station and the NR base station.

Within the present document, a mobile apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an Internet of Things (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In some examples, the term downlink may refer to a point-to-multipoint transmission originating at a base station (e.g., base station 108). Another way to describe this point-to-multipoint transmission scheme may be to use the term broadcast channel multiplexing. Transmissions from a UE (e.g., UE 106) to a base station (e.g., base station 108) may be referred to as uplink (UL) transmissions. In some examples, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate with other UEs in a peer-to-peer or device-to-device fashion and/or in a relay configuration.

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 and/or uplink control information 118 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols in some examples. A subframe may refer to a duration of 1 millisecond (ms). Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
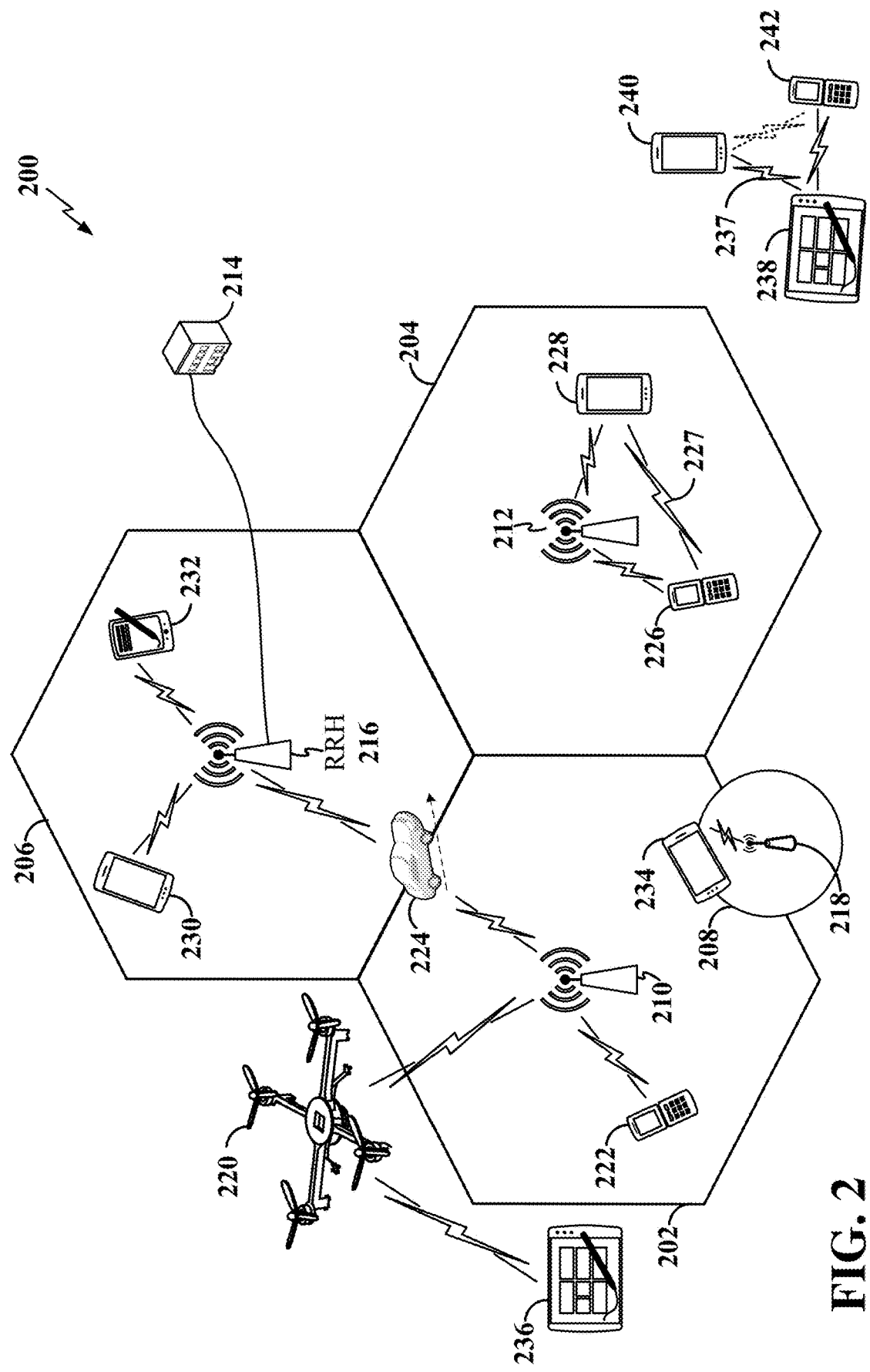
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1.

The geographic area covered by the RAN 200 may be divided into cellular regions (cells) that can be uniquely identified by a user equipment (UE) based on an identification broadcasted from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 236, 238, 240, and/or 242 may be the same as the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of the serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple radio access technologies (RATs). For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM)

with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancelation technologies. Full-duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separate from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to as sub-band full-duplex (SBFD), also known as flexible duplex.

Figure 3:
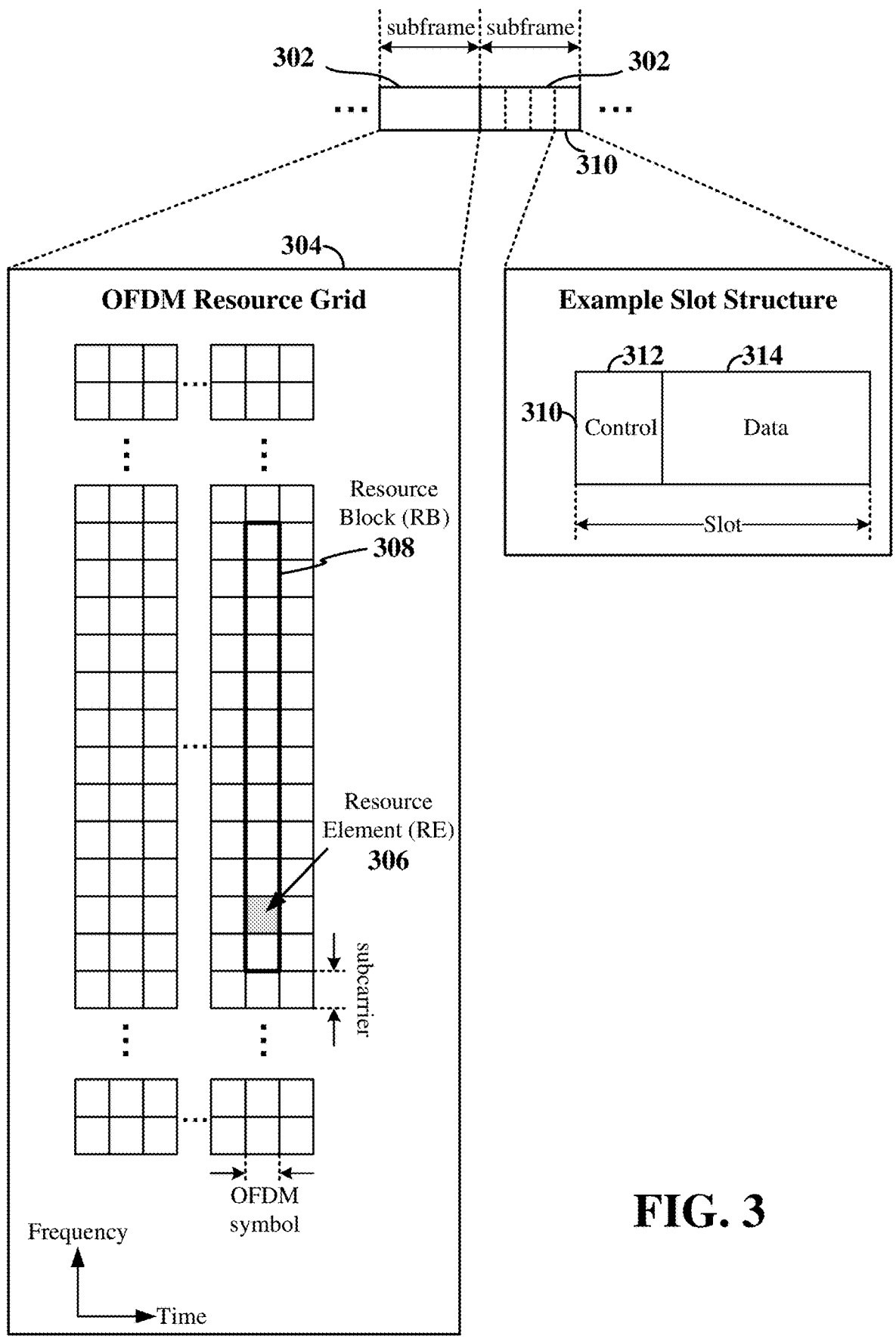
FIG. 3 is a schematic illustration of an example of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an example subframe 302 is illustrated, showing an OFDM resource grid. However, as those skilled in the art will readily appreciate, the physical (PHY) layer transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 13 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely an example, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional (remaining) system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

As the SI may change over time, the scheduling entity may send paging messages that indicate a change in the SI. Accordingly, a UE may periodically monitor a paging channel for these and other paging messages. If a paging message indicates that the SI has changed, the UE monitors a broadcast channel or some other designated channel for the new SI.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., an Rx V2X device or some other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

As discussed above, a BS may transmit synchronization signals (e.g., including PSS and SSS) in the network to enable UEs to synchronize with the BS, as well as SI (e.g., including a MIB, RMSI, and OSI) to facilitate initial network access. The BS may transmit the PSS, the SSS, and/or the MIB via SSBs over PBCH and may broadcast the RMSI and/or the OSI over the PDSCH.

A UE attempting to access the network may perform an initial cell search by detecting a PSS from a BS (e.g., the PSS of a cell of the BS). The PSS may enable the UE to synchronize to period timing of the BS and may indicate a physical layer identity value assigned to the cell. The UE may also receive an SSS from the BS that enables the UE to synchronize on the radio frame level with the cell. The SSS may also provide a cell identity value, which the UE may combine with the physical layer identity value to identify the cell.

After receiving the PSS and SSS, the UE may receive SI from the BS. The SI may take the form of a master information block (MIB) and system information blocks (SIBs). The system information includes essential or critical information for a UE to access the network such as downlink (DL) channel configuration information, uplink (UL) channel configuration information, access class information, and cell barring information, as well as other less critical information. The MIB may include system information for initial network access and scheduling information for RMSI and/or OSI.

After decoding the MIB, the UE may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, and SRS. For example, the SIB type one (SIB1) provides scheduling information and/or availability of other SIB types and/or information (e.g., public land mobile network (PLMN) information and/or cell barring information) that can guide a UE in performing cell selection and/or cell reselection. For example, a UE may search for a suitable cell based on SIB1 information received from the BS.

Some examples for the other SIB types may include a SIB type two (SIB2), a SIB type three (SIB3), a SIB type four (SIB4), and a SIB type five (SIB5). A SIB2 provides information for cell reselection that are common for inter-frequency cell reselection, intra-frequency cell reselection, and inter-radio access technology (inter-RAT) cell reselection. For example, a SIB2 may include measurement thresholds for a UE to determine when to start searching for another cell, cell priorities for cell reselection, and/or various cell reselection criteria and/or thresholds. A SIB3 provides neighboring cell related information for intra-frequency cell reselection. For example, the SIB3 includes physical cell identifier (ID) information associated with an intra-frequency neighboring cell and/or corresponding criteria for cell reselection. A SIB4 provides neighboring cell related information for inter-frequency cell reselection. For example, the SIB4 includes physical cell ID, frequency carrier, frequency band, and/or beam information associated with an inter-frequency neighboring cell and/or corresponding criteria for cell reselection. A SIB5 provides neighboring cell related information for inter-RAT cell reselection. For example, the SIB5 includes RAT, frequency carrier, frequency band, and/or beam information associated with an inter-RAT neighboring cell and/or corresponding criteria for cell reselection. An example of an inter-RAT cell reselection may include a UE camped on an NR cell and reselecting to camp on an LTE cell. Alternatively, a UE camped on an LTE cell may reselect to camp on an NR cell. In some instances, an inter-RAT cell reselection may be based on UE's preferences.

In some examples, for a cell that is an intra-frequency neighbor cell of a serving cell, the SIB3 may include information to guide a UE to reselect to the neighbor cell. Alternatively, if the neighbor cell is an inter-frequency neighbor cell of the serving cell, the SIB4 may include information to guide a UE to reselect to the neighbor cell. If the neighbor cell is an inter-RAT neighboring cell of the serving cell, the SIB5 may include information to guide a UE to reselect to the neighbor cell.

After obtaining the MIB, the RMSI and/or the OSI, the UE may perform a random access procedure for initial access to a RAN (e.g., the RAN 200 of FIG. 2). The RAN (e.g., a base station) broadcasts information that enables a UE to determine how to conduct the initial access. This information may include a configuration for a random access channel (RACH) that the UE uses to communicate with the RAN during initial access. The RACH configuration may indicate, for example, the resources allocated by the RAN for the RACH.

Figure 4:
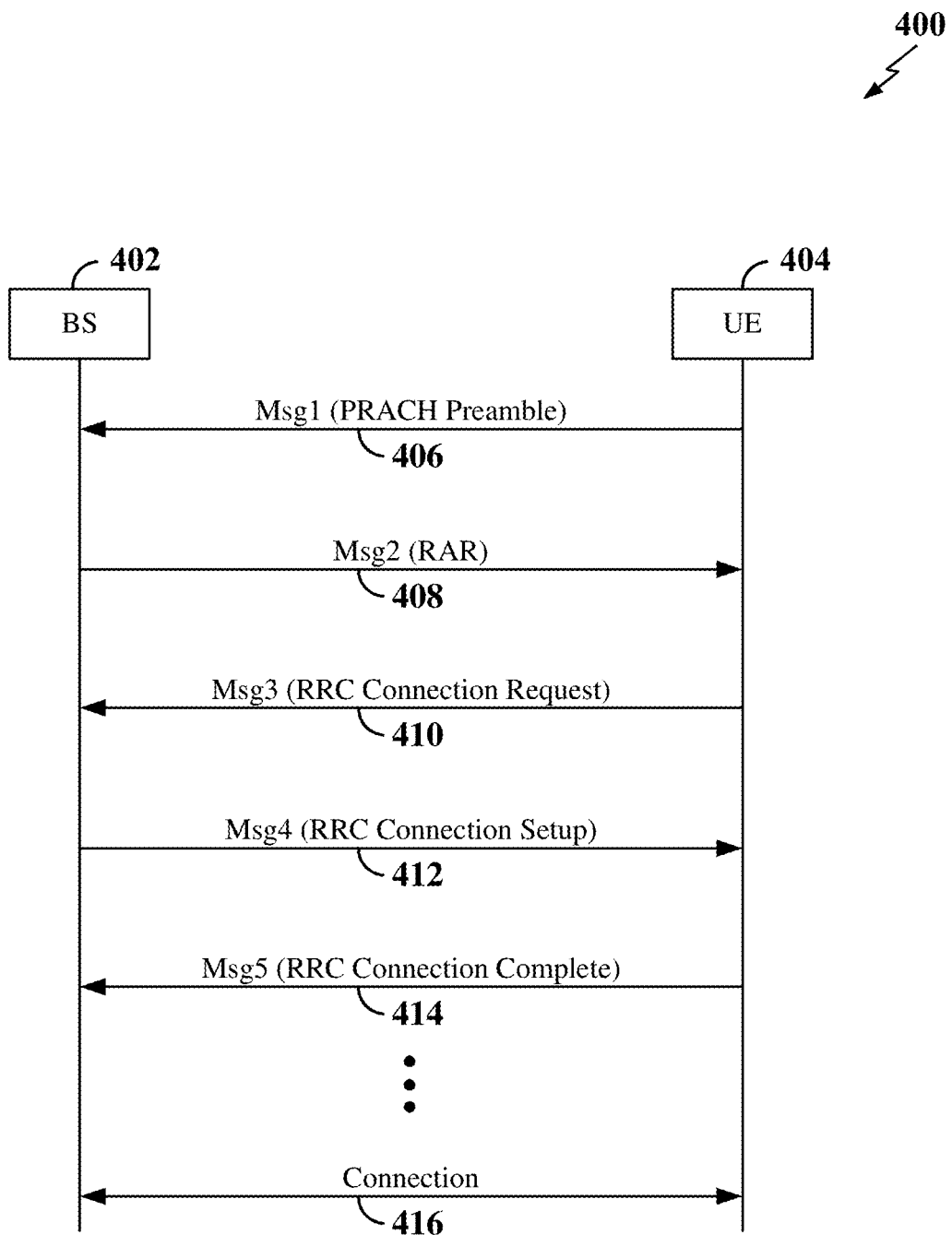
FIG. 4 is a signaling diagram of an example of random access channel (RACH) signaling according to some aspects.

FIG. 4 is a signaling diagram 400 illustrating an example of signaling for a contention-based RACH procedure in a wireless communication system including a base station (BS) 402 and a UE 404. In some examples, the base station 402 may correspond to any of the base stations or scheduling entities shown in any of FIGS. 1 and 2. In some examples, the UE 404 may correspond to any of the UEs or scheduled entities shown in any of FIGS. 1, 2, 7, and 17.

At 406 of the random access procedure, the UE 404 may transmit a Msg1. In some examples, RACH Msg1 is referred to as a physical RACH (PRACH) preamble or PRACH for short. As mentioned above, the UE 404 may transmit the PRACH on resources specified by a RACH configuration included in SIB2. At 408, the BS 402 may respond with a Msg2 of the RACH procedure. RACH Msg2 may be referred to informally as a random access response (RAR). In some examples, the BS 402 transmits a DCI on a PDCCH, where the DCI schedules a PDSCH (e.g., the DCI specifies the resources for the PDSCH transmission). The BS 402 then transmits the PDSCH which includes the RAR data such as, for example, an UL grant for the UE 404 to transmit a Msg3 of the RACH procedure. In some examples, the UE 404 monitors for RACH Msg2 on resources specified by the RACH configuration during the RAR window specified by the RACH configuration. The UE 404 may decode the DCI carried on the PDCCH and then decode the RAR data carried on the PDSCH. Upon receiving all of the RAR information, the UE 404 may transmit a Msg3 of the RACH procedure to the BS at 410. In some examples, RACH Msg3 is a radio resource control (RRC) Connection Request message. At 412, the BS 402 may respond with a Msg4 of the RACH procedure. In some examples, RACH Msg4 is an RRC Connection Setup message (e.g., a contention resolution message). At 414, the UE 404 responds with a Msg5 of the RACH procedure. In some examples, RACH Msg5 is an RRC Connection Complete message. After establishing a connection at 416, the UE 404 and the BS 402 may enter a normal operation stage, where operational data may be exchanged. For example, the BS 402 may schedule the UE 404 for UL communication and/or DL communication.

Figure 5:
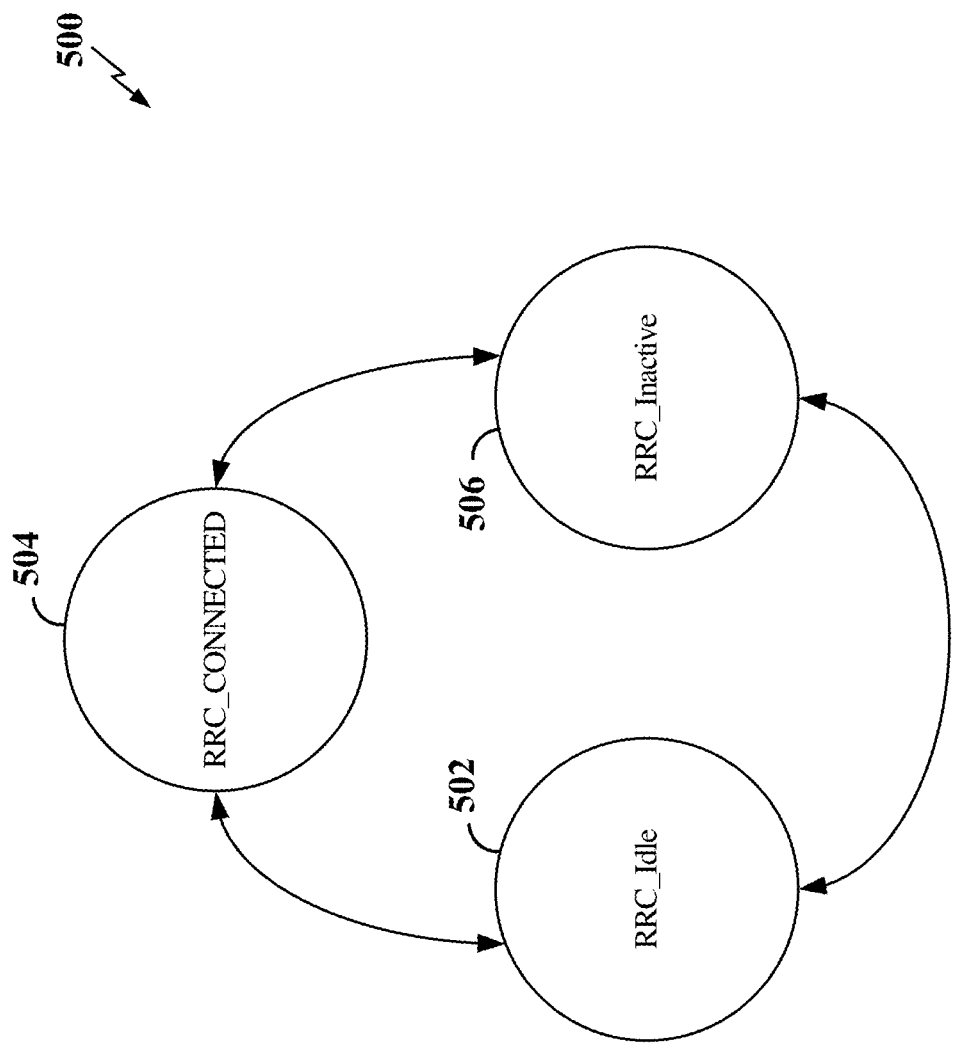
FIG. 5 is a conceptual illustration of an example of communication state transitions according to some aspects.

A UE under the coverage area of a RAN may operate in one of several defined operating states (also referred to as modes). In some examples, these states include an idle state, an inactive state, and a connected state. In 5G NR, these operating states are defined as radio resource control (RRC) states: RRC_IDLE, RRC_INACTIVE, and RRC_CONNECTED as shown in the state transition diagram 500 of FIG. 5.

A UE will be in an idle state (e.g., RRC_IDLE 502) when it first powers up. The UE may transition to a connected state (e.g., RRC_CONNECTED 504) with a RAN by performing a random access procedure with that RAN. In the connected state, the UE may communicate with the RAN via dedicated signaling (e.g., dedicated channels). A UE may switch to idle state or inactive state (e.g., RRC_INACTIVE 506) under certain circumstances. For example, a UE that does not have data to send to the RAN and that is not receiving data from the RAN may elect to switch to the idle state or the inactive state to conserve battery power. In these states, since the UE is not actively communicating with the RAN, the UE may power off some of its components (e.g., radio components). That is, the UE enters a lower power state.

Figure 6:
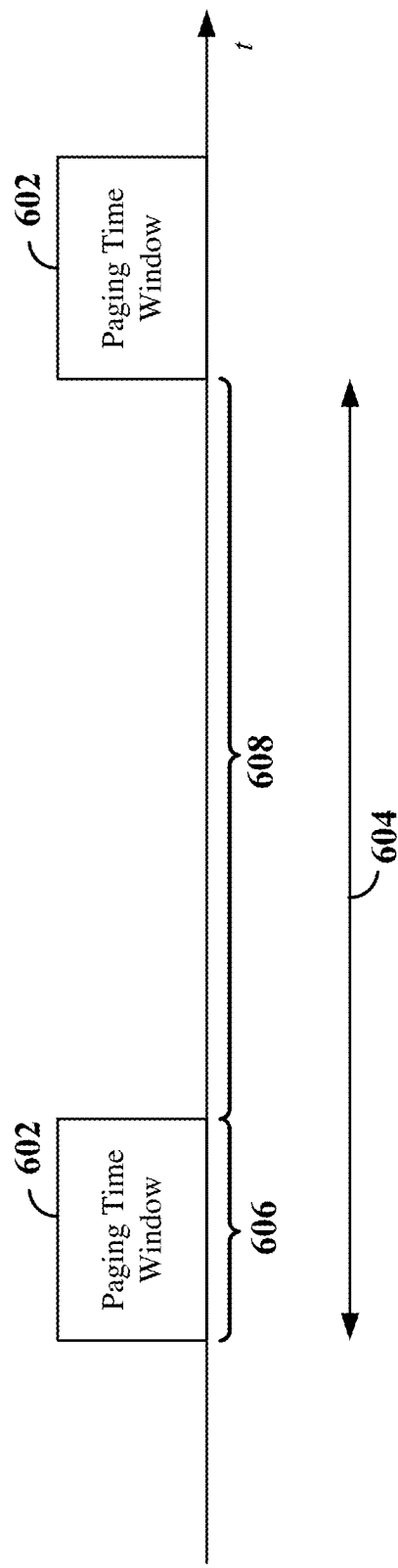
FIG. 6 is a conceptual illustration of an example of a discontinuous reception (DRX) cycle according to some aspects.

The UE will periodically wake up from the low power state to monitor for signaling from the RAN (e.g., to determine whether the RAN has data to send to the UE). This periodicity is based on a discontinuous reception (DRX) cycle specified by the RAN. FIG. 6 illustrates an example 600 of such a DRX cycle where paging time windows 602 are separated in time according to a DRX cycle period 604. In this example, each paging time window corresponds to a time period 606 during which time the UE wakes up from the lower power state to receive paging messages from the RAN. If the RAN has data to send to the UE or if the RAN needs to communicate with the UE for other reasons, the RAN will page the UE according to the DRX cycle (i.e., during the paging time windows 602 when the UE periodically wakes up from the lower power state). The RAN sends a paging message via a paging channel (e.g., via a paging frame). In addition, the RAN may define different paging opportunities that can be used by different UEs to receive a paging message. That is, UEs remain in the lower power state (e.g., during the time period 608) until their own paging opportunities occur. The use of different paging opportunities for different UEs allows the RAN to direct paging to a particular UE or a small subset of UEs. This reduces the likelihood that a UE will need to expend battery power to process paging that is directed to another UE. Upon receiving a paging message indicating that the network will be sending data (or other information) that a UE needs to receive, the UE may resume full operations (e.g., turn on all radio components) and, if needed, reestablish a connected state with the RAN.

The RAN may configure a UE (e.g., via broadcast) with information that enables a UE to receive a paging message. For example, this information may identify one or more of: a paging channel (e.g., the resources used for paging), a paging frame, at least one parameter that a UE uses to determine its paging opportunities, or a paging-radio network temporary identifier (P-RNTI) that the RAN uses to send a paging message.

The RAN uses different RNTIs to scramble different information sent to UEs. This enables a UE to ignore transmitted information (e.g., information transmitted using a different RNTI) that does not concern that UE. An RNTI table specifies the RNTI values designated by the network as needed to transmit information over different channels. For example, the RAN may designate one of these values for a random access RNTI (RA-RNTI), the RAN may designate another one of these values for a transmit power control RNTI (TPC-PUCCH-RNTI), and so on. A fixed RNTI value (FFFE) may be used for sending a paging message (P-RNTI). Another fixed RNTI value (FFFF) may be used for sending SI (P-RNTI).

A RAN may use DCI to page a UE. For example, the RAN may transmit DCI including a paging indicator during a paging opportunity. As discussed above, a DCI may schedule uplink or downlink transmissions. In addition, a DCI may include a short message that includes a paging indicator. The short message indicator may indicate whether the DCI includes a short message. A field of the short message may indicate whether SI has been modified. Thus, the DCI may be used to send a paging message to UEs indicating that SI has changed.

For short message reception in a paging occasion, a UE may monitor the PDCCH monitoring occasion(s) for paging as follows. The paging frame (PF) and paging occasion (PO) used for paging may be determined by the following formulas: system frame number (SFN) for the PF may be determined by: (SFN+PF_offset) mod T=(T div N)*(UE_ID mod N); and Index (i_s), indicating the index of the PO may be determined by: i_s=floor (UE_ID/N) mod Ns.

The PDCCH monitoring occasions for paging may be determined according to a pagingSearchSpace and a firstPDCCH-MonitoringOccasionOfPO, if configured. When SearchSpaceId=0 is configured for the pagingSearchSpace, the PDCCH monitoring occasions for paging may be the same as for the remaining minimum SI (RMSI).

The following parameters may be used for the calculation of PF and i_s above in some examples: T: DRX cycle of the UE (T is determined by the shortest of the UE specific DRX value(s), if configured by RRC and/or upper layers, and a default DRX value broadcast in system information. In RRC_IDLE state, if UE specific DRX is not configured by upper layers, a default value may be applied); N: number of total paging frames in T; Ns: number of paging occasions for a PF; PF_offset: offset used for PF determination; UE_ID: 5G-S-TMSI mod 1024. Here, the 5G-S-TMSI is a shortened version of the 5G global unique temporary identifier (GUTI) that includes the 5G temporary mobile subscriber identity (TMSI).

The parameters Ns, nAndPagingFrameOffset, and the length of default DRX Cycle may be signaled in SIB1. The values of N and PF_offset may be derived from the parameter nAndPagingFrameOffset. The parameter first-PDCCH-MonitoringOccasionOfPO may be signaled in SIB1 for paging in an initial DL BWP. For paging in a DL BWP other than the initial DL BWP, the parameter first-PDCCH-MonitoringOccasionOfPO may be signaled in the corresponding BWP configuration.

If the UE has not been assigned a 5G-S-TMSI, for instance when the UE has not yet registered onto the network, the UE may use as a default identity UE_ID=0 in the PF and i_s formulas above. In some examples, a 5G-S-TMSI is a 48 bit long bit string, interpreted as a binary number where the left most bit represents the most significant bit.

As mentioned above, SI may be critical to a UE since it carries the basic configuration a UE may need for connecting to a BS, neighbor cell information for mobility purposes, and important messages such public warning system (PWS) messages. PWS messages may include, for example, commercial mobile alert system (CMAS) messages and earthquake and tsunami warning system (ETWS) messages.

A BS repeatedly transmits SI at certain rates to enable UEs to receive the SI after one or more attempts. In addition, the BS may transmit SI (e.g., repeatedly over time) if there is a change or update to an SI configuration or message.

The disclosure relates in some aspects to techniques for a UE to acquire SI in an efficient manner. In some examples, the techniques described herein may shorten the amount of time it takes for a UE to receive SI. In some examples, the techniques described herein may increase a UE's success rate for receiving SI. In some examples, the techniques described herein may result in lower UE power consumption.

Figure 7:
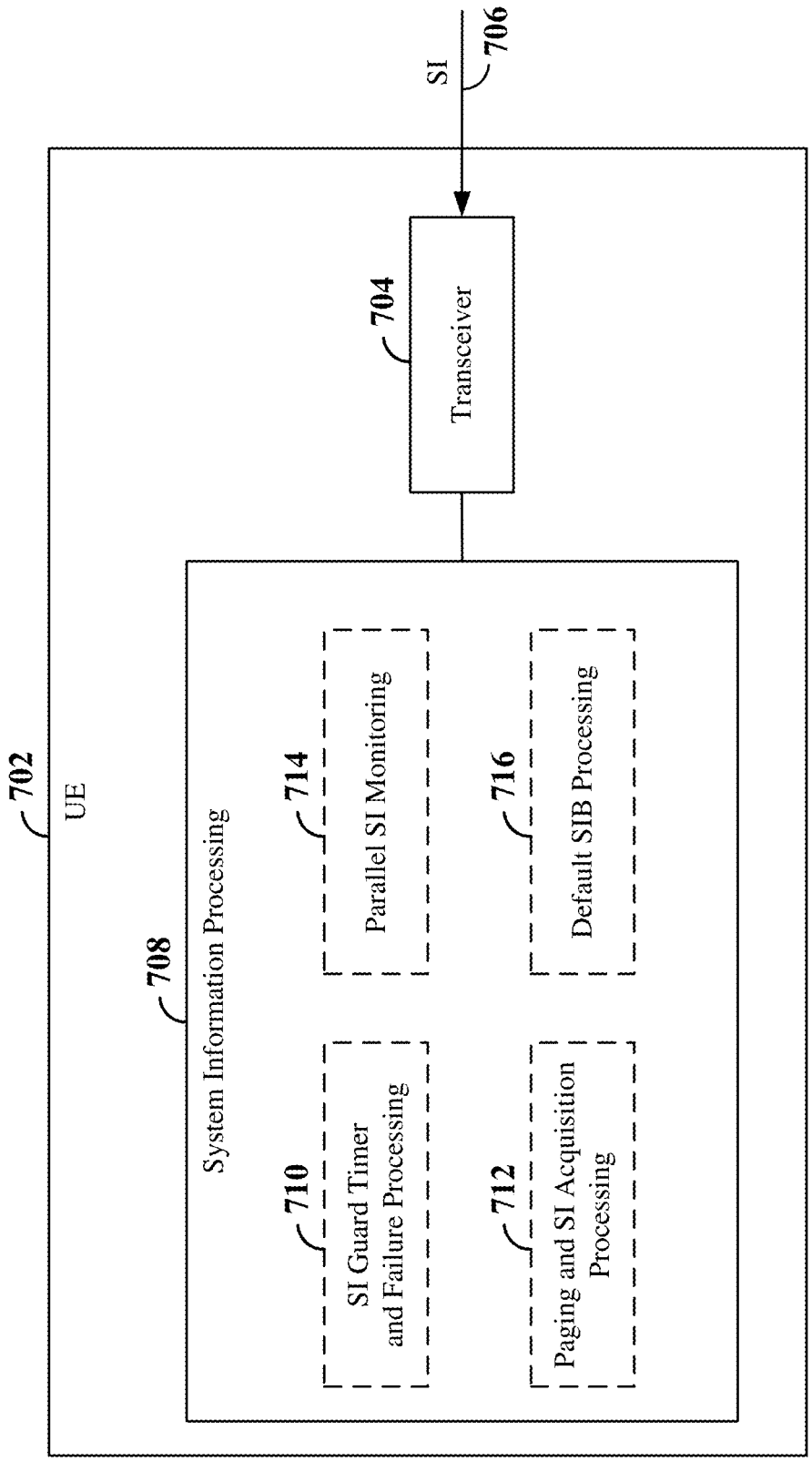
FIG. 7 is a block diagram of an example user equipment according to some aspects.

FIG. 7 illustrates an example of a UE 702 that may acquire SI according to some examples. The UE 702 includes a transceiver 704 for receiving SI 706 sent (e.g., broadcast) by a BS (not shown in FIG. 7). The UE 702 also includes system information processing circuitry 708 to, for example, perform one or more of controlling the acquisition of SI, processing received SI, taking action based on received SI, taking action based on a failure to receive SI, or a combination thereof. In some examples, the UE 702 may correspond to any of the UEs or scheduled entities shown in any of FIGS. 1, 2, 4, and 17.

In some examples, the system information processing circuitry 708 includes SI guard timer and failure processing circuitry 710. The SI guard timer and failure processing circuitry 710 may be configured to, for example, monitor for system information, determine that the system information is not received prior to a limit for the monitoring being reached, and conduct a failure procedure after determining that the system information is not received. Here, the failure procedure may be based on a type of the system information. In some examples, these operations may involve one or more of the operations described below in conjunction with FIGS. 8-10, 17, and 18. In some aspects, these operations may reduce the amount of time the UE 702 spends trying to acquire SI.

In some examples, the system information processing circuitry 708 includes paging and SI acquisition processing circuitry 712. The paging and SI acquisition processing circuitry 712 may be configured to, for example, determine, after entering the coverage of the cell, that there are no paging opportunities for the UE during a period of time, and monitor for system information after determining that there are no paging opportunities for the UE during a period of time. Alternatively, or in addition, the paging and SI acquisition processing circuitry 712 may be configured to, for example, determine, after entering the coverage of the cell, that a quantity of paging opportunities remaining for the UE during a period of time is less than or equal to a threshold, and monitor for system information after determining that a quantity of paging opportunities remaining for the UE during a period of time is less than or equal to a threshold. In some examples, these operations may involve one or more of the operations described below in conjunction with FIGS. 11, 12, 17, 19, and 20. In some aspects, these operations may enable the UE 702 to acquire an SI update more quickly in a scenario where the UE 702 may have missed a paging occasion (e.g., that indicated the SI update).

In some examples, the system information processing circuitry 708 includes parallel SI monitoring circuitry 714. The parallel SI monitoring circuitry 714 may be configured to, for example, send a request for first system information to a base station and, after sending the request and prior to receiving a response to the request, monitor for the first system information from the base station. In some examples, these operations may involve one or more of the operations described below in conjunction with FIGS. 13-15, 17, and 21. In some aspects, these operations may enable the UE 702 to receive requested SI more quickly.

In some examples, the system information processing circuitry 708 includes default SIB processing circuitry 716. The default SIB processing circuitry 716 may be configured to, for example, communicate via a first cell of a base station, determine that first system information of the first cell was not acquired, and set at least one parameter in a first system information block to invoke cell reselection to a second cell as a result of determining that the first system information of the first cell was not acquired. In some examples, these operations may involve one or more of the operations described below in conjunction with FIGS. 13-15, 17, and 21. In some aspects, these operations may enable the UE 702 to reselect to another cell more quickly (e.g., when SI is not received from the current serving cell).

In some examples, the system information processing circuitry 708 may include any one or any combination of the SI guard timer and failure processing circuitry 710, the paging and SI acquisition processing circuitry 712, the parallel SI monitoring circuitry 714, or the default SIB processing circuitry 716. For example, by combining this functionality, the SI-related operations at the UE 702 may benefit from the advantages provided by any one or any combination of the SI guard timer and failure processing circuitry 710, the paging and SI acquisition processing circuitry 712, the parallel SI monitoring circuitry 714, or the default SIB processing circuitry 716.

Figure 8:
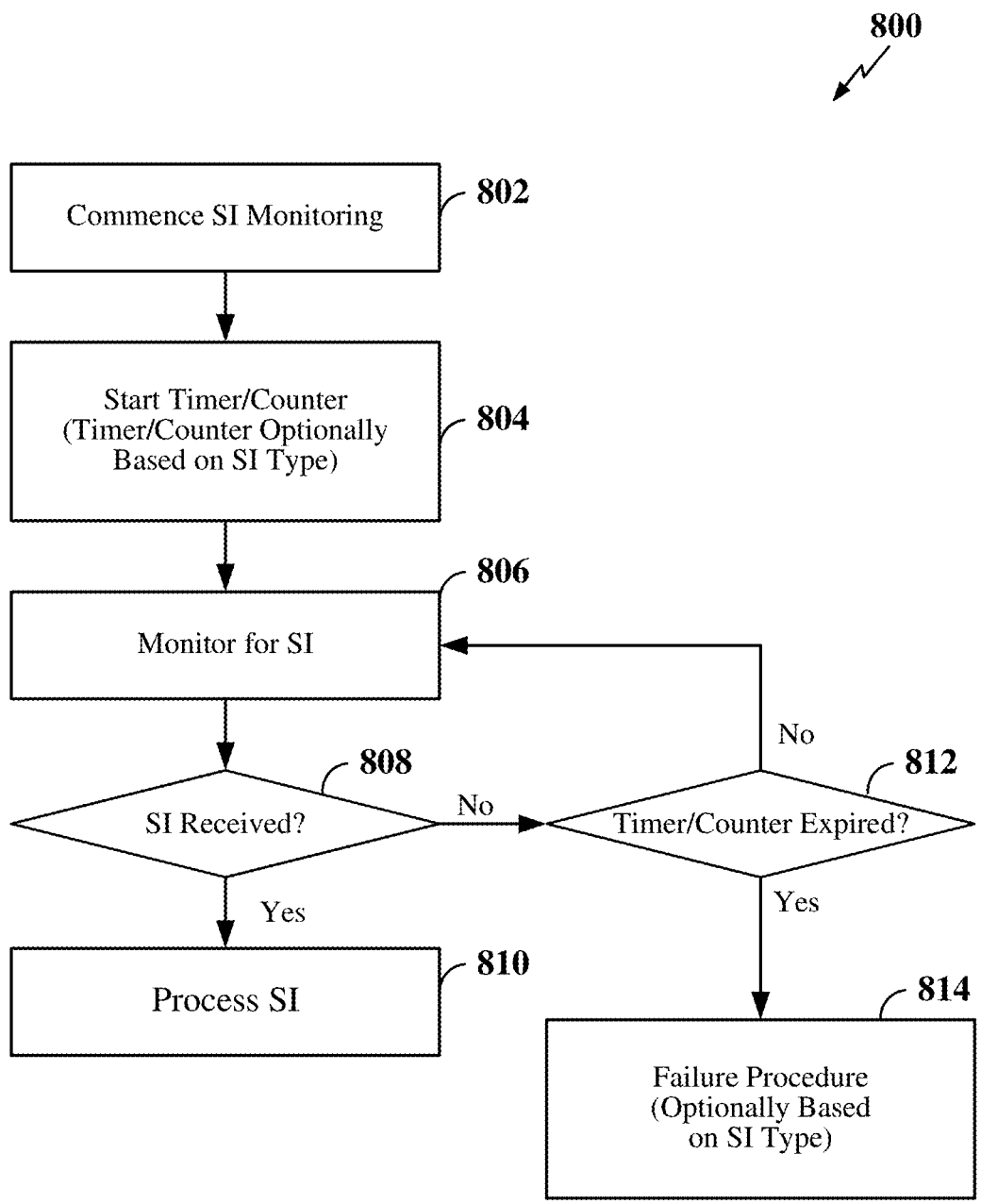
FIG. 8 is a flow chart illustrating an example of a process for monitoring for system information (SI) according to some aspects.
Figure 9:
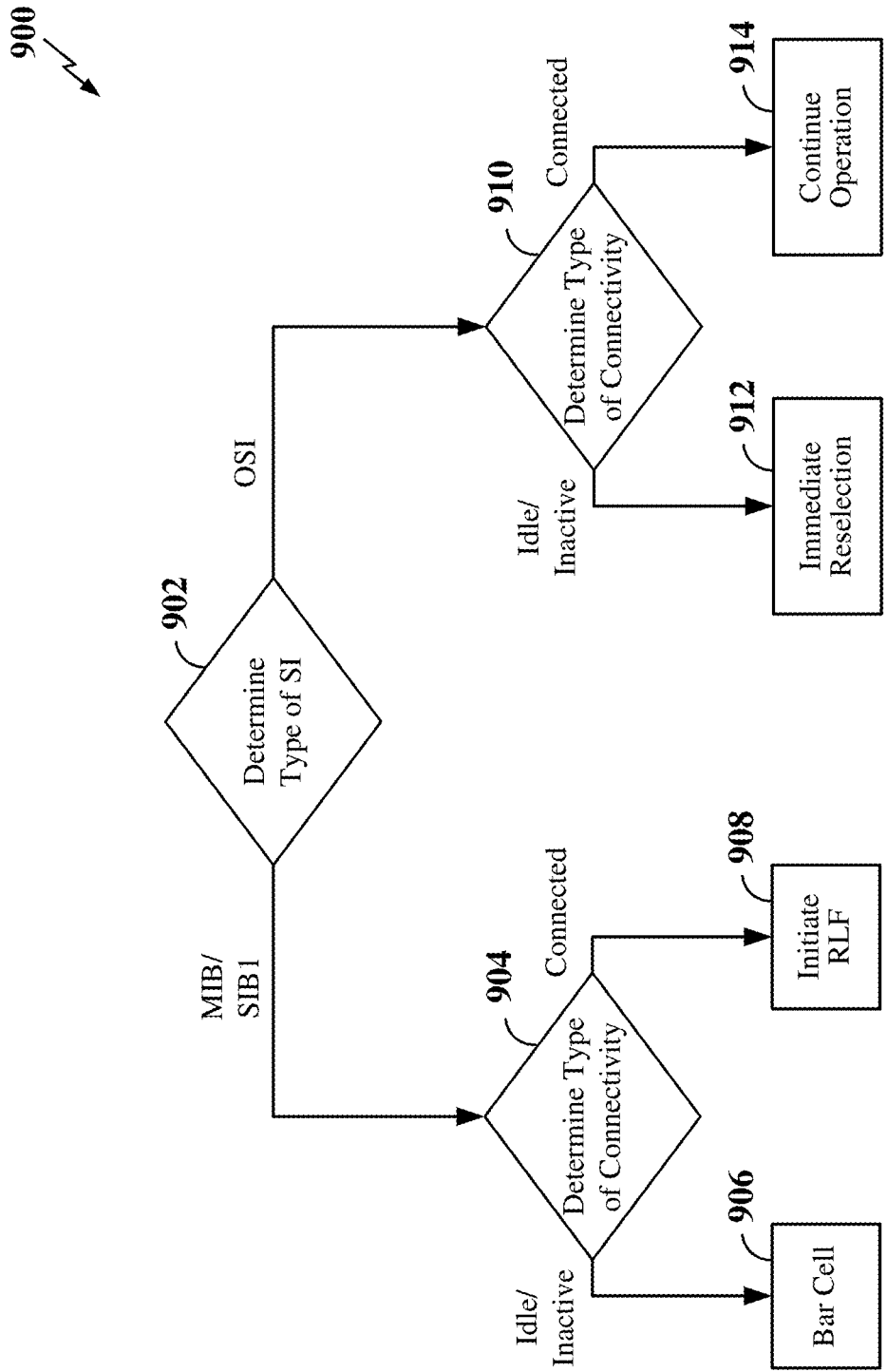
FIG. 9 is a flow chart illustrating an example of a failure handling process according to some aspects.
Figure 10:
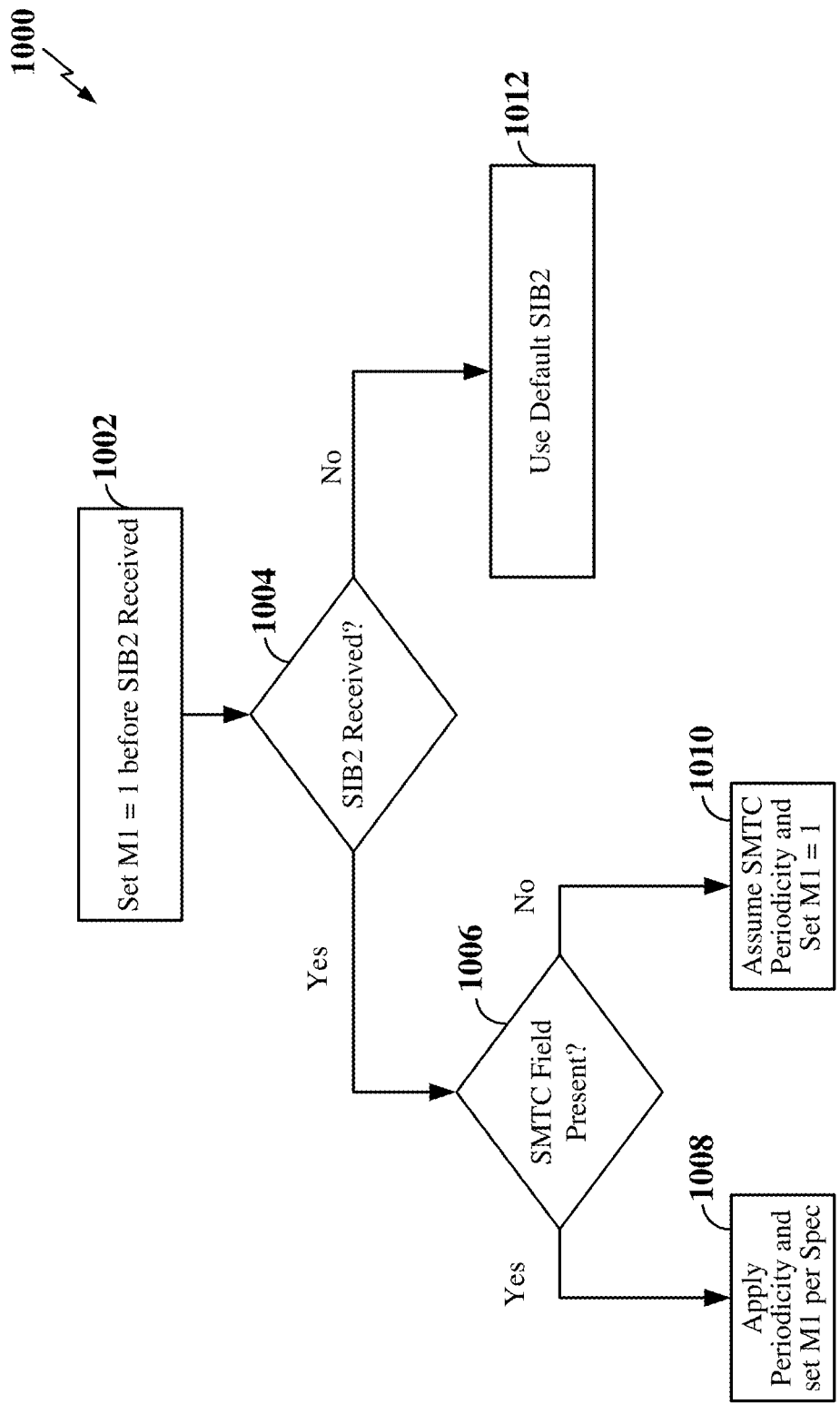
FIG. 10 is a flow chart illustrating an example of a parameter selection process according to some aspects.

Referring to FIGS. 8-10, techniques for monitoring for SI and taking action thereon according to some examples will be described. These techniques relate in some aspects to restricting the amount of time a UE monitors for SI (e.g., restricting the number of attempts a UE makes to acquire SI).

A BS repeatedly broadcasts SI. Thus, a UE with at least fair downlink radio conditions should be able to acquire the MIB and the SIBs after at most a few attempts.

If a UE is not able to successfully receive important system information in a timely manner, the UE's camping process may be delayed (e.g., the UE remains in a no-service condition) or the UE might not be able to continue to camp on a cell.

Moreover, if a UE is not able to successfully receive important system information in a timely manner, the UE may unnecessarily expend processing resources and/or battery power monitoring for SI. For example, if SI is not received after a few attempts, it may be likely that subsequent attempts will fail as well.

The disclosure relates in some aspects to preventing a UE from indefinitely trying to acquire SI in the face of repeated failed attempts. In some examples, a UE uses a guard timer when monitoring for broadcast SI. The guard timer is started when the UE commences monitoring for SI (e.g., SI of a particular type). While the timer is running, the UE may repeatedly attempt acquiring the same MIB and/or SIB. If the timer expires without the UE successfully receiving the SI, the SI monitoring is deemed to have failed (e.g., decoding of the corresponding SI is deemed to have failed).

FIG. 8 is a flow chart illustrating an example process 800 for using a guard timer when monitoring for SI according to some aspects of the disclosure. Some or all illustrated features may be omitted in a particular implementation within the scope of the disclosure, and some illustrated features may not be required for implementation of all examples. In some examples, the process 800 may be carried out by one or more of the UE 106 of FIG. 1, any of the UEs of FIG. 2, the UE 404 of FIG. 4, the UE 702 of FIG. 7 (e.g., the SI guard timer and failure processing circuitry 710), or the UE 1700 of FIG. 17. In some examples, the process 800 may be carried out by the processing system 1714 of FIG. 17. In some examples, the process 800 may be carried out by any suitable apparatus or means for carrying out the functions or algorithm described below.

At block 802, a UE commences SI monitoring. At block 804, upon commencing SI monitoring, the UE starts a timer (or counter). In some examples, a single timer value or counter may be used for receiving all types of SI.

In some examples, one or more aspects of the timer (or counter) may depend on the type of SI that the UE is monitoring. As one example, a first timer value (e.g., indicating when the timer expires) may be used for one type of SI and a second timer value (different from the first timer value) may be used for another type of SI. In some examples, a shorter timer value may be used for more important SI.

In some examples, a first count value (e.g., indicating a maximum count) may be used for one type of SI and a second count value (different from the first count value) may be used for another type of SI. In some examples, a shorter count value may be used for more important SI.

In some examples, a timer value used for acquiring the MIB, the SIB1, or the SIB2, may be based on the formula: N*SI periodicity. Here, N may be a configurable number (e.g., N=4 or some other number).

In some examples, a timer value used for acquiring OSI (e.g., including PWS), may be based on the formula: max (N*SI periodicity; Nserv*DRX cycle length). Again, N may be a configurable number (e.g., N=4 or some other number).

In some examples, Nserv may be calculated as follows. Nserv may be dependent on the DRX cycle length and the numerology (FR1 vs. FR2). As described in the 3GPP Technical Specification (TS) 38.133 V16.2.0 (January 2020), a UE may measure the synchronization signal (SS) reference signal received power (SS-RSRP) and the SS reference signal received quality (SS-RSRQ) level of the serving cell and evaluate the cell selection criterion S for the serving cell at least once every M1*N1 DRX cycle; where: M1=2 if the SS/PBCH block measurement time configuration (SMTC) periodicity (TSMTC)>20 ms and the DRX cycle≤0.64 seconds, otherwise M1=1. See Table 4.2.2.2-1 of this specification reproduced below as Table 1 for convenience reference.

TABLE 1

| DRX cycle length(s) | Scaling Factor (N1) FR1 | Scaling Factor (N1) FR2 (Note1) | Nmax (number of DRX cycles) |
|---|---|---|---|
| 0.32 | 1 | 8 | M1*N1*4 |
| 0.64 | | 5 | M1*N1*4 |
| 1.28 | | 4 | N1*2 |
| 2.56 | | 3 | N1*2 |

Note 1:
Applies for UE supporting power class 2, 3 & 4. For UE supporting power class 1, N1-8 for all DRX cycle length.

In some examples, a count value may relate to an age for SI. In some examples, a UE can monitor an age of all SIs (or different ages for different SIs). A UE may choose a small granularity in time at which the age will be incremented (e.g., every 10 milliseconds, ms). A deadline or life cycle for each SI may then be determined as follows: deadline/life cycle of SI x=equivalent guard timer/granularity. For example, if SI 2 contains SIB2, and has a periodicity of 160 ms, and assuming N=4 (in the guard timer derivation), then the deadline for SI 2=age of 4*16=64.

Different deadlines/life cycles may be used in different scenarios. In some examples, the same deadline/life cycle may be used for all types of SI. In other examples, different SIs may have different deadlines/life cycles.

Referring again to FIG. 8, at block 806, the UE may monitor for SI. For example, when operating in an idle state, the UE may periodically wake up (e.g., based on a DRX cycle) to monitor for SI broadcasts. At block 808, the UE determines whether it has received the SI. If so, the UE processes the SI at block 810. If the UE had not yet received the SI at block 808, the operational flow proceeds to block 812 where the UE determines whether the timer (or counter) has expired). If not, the operational flow proceeds back to block 806. If the timer (or counter) was expired at block 812, the operational flow proceeds to block 814 where the UE performs a failure procedure. For example, upon reaching the timer value or the deadline/life cycle, if UE was unable to acquire the SI, the SI acquisition is deemed to have failed.

In some examples, one failure procedure may be used for all types of SI. In other examples, different failure procedures may be used for different types of SI. Table 2 illustrates one form of SI type-based failure handling according to the disclosure that may be used in some examples. Other types of failure handling and other failure handling operations may be used in other examples.

TABLE 2

| SI type | UE State | Guard Timer expires | Comment |
|---|---|---|---|
| MIB/SIB1 | Idle/Inactive | Bar the cell for 300 sec. | Baseline handling. MIB and SIB1 are deemed essential for camping and thus aggressive failure handling is used. |
| | Connected | Radio link failure followed by reestablishment. Bar the cell for 300 sec. | Alternative handling such as immediate reselection may be used in some examples |
| Other SIs | Idle/Inactive | Immediate reselection Pseudo SIB2 | Since the current cell is not an ideal cell, the UE is configured to leave the cell as soon as possible. |
| | Connected | No special | This option may |

TABLE 2-continued

| SI type | UE State | Guard Timer expires | Comment |
| --- | --- | --- | --- |
| | | handling | provide a better user experience. Connected mode can rely on a measurement object to configure neighbors. |

An example of the immediate reselection procedure of Table 2 follows. Upon failing to camp on a selected cell due to a failure to receive system information from the selected cell, the UE may perform a fast cell reselection instead of declaring out-of-service (OOS) and restarting a time-consuming and/or power-consuming initial cell selection procedure as in a conventional UE procedure. In other words, the fast cell reselection is initiated based on a system information reception failure instead of based on cell signal measurements as in a conventional cell reselection procedure. In addition, the UE may reselect to another cell without having to monitor signal measurements from the cell for a certain duration and ensuring that the cell is better than the serving cell for the duration before the reselection, and thus providing a fast or immediate cell reselection. Further, the network session may be maintained while the UE performs the fast cell reselection, and thus can increase the amount of time the UE is in service and reduce missed calls for the UE.

FIG. 9 is a flow chart illustrating an example SI acquisition failure process 900 according to some aspects of the disclosure. Some or all illustrated features may be omitted in a particular implementation within the scope of the disclosure, and some illustrated features may not be required for implementation of all examples. In some examples, the process 900 may be carried out by one or more of the UE 106 of FIG. 1, any of the UEs of FIG. 2, the UE 404 of FIG. 4, the UE 702 of FIG. 7 (e.g., the SI guard timer and failure processing circuitry 710), or the UE 1700 of FIG. 17. In some examples, the process 900 may be carried out by the processing system 1714 of FIG. 17. In some examples, the process 900 may be carried out by any suitable apparatus or means for carrying out the functions or algorithm described below.

At block 902, a UE determines the type of SI. If the SI type is determined to be MIB or SIB1 at block 902, the operational flow proceeds to block 904 where the UE determines the type of connectivity. If the connectivity type is determined to be idle or inactive at block 904, the operational flow proceeds to block 906 where the UE bars the current cell (e.g., for a defined period of time). If the connectivity type is determined to be connected at block 904, the operational flow proceeds to block 908 where the UE initiates a radio link failure (RLF) followed by connection reestablishment (e.g., with another cell). The UE may also bar the current cell (e.g., for a defined period of time). In some examples, the UE may perform an immediate reselection procedure. If the SI type is determined to be OSI at block 902, the operational flow proceeds to block 910 where the UE determines the type of connectivity. If the connectivity type is determined to be idle or inactive at block 910, the operational flow proceeds to block 912 where the UE performs immediate reselection. If the connectivity type is determined to be connected at block 904, the operational flow proceeds to block 914 where the UE may continue with normal operations.

FIG. 10 is a flow chart illustrating an example process 1000 for calculating the M1 value of Table 1 according to some aspects of the disclosure. Some or all illustrated features may be omitted in a particular implementation within the scope of the disclosure, and some illustrated features may not be required for implementation of all examples. In some examples, the process 1000 may be carried out by one or more of the UE 106 of FIG. 1, any of the UEs of FIG. 2, the UE 404 of FIG. 4, the UE 702 of FIG. 7 (e.g., the SI guard timer and failure processing circuitry 710), or the UE 1700 of FIG. 17. In some examples, the process 1000 may be carried out by the processing system 1714 of FIG. 17. In some examples, the process 1000 may be carried out by any suitable apparatus or means for carrying out the functions or algorithm described below.

At block 1002, a UE sets M1=1 before SIB2 is received. That is, the value of M1 may be initially assumed to be equal to 1. At block 1004, the UE determines whether SIB2 has been received. If SIB2 was received, the operational flow proceeds to block 1006 where the UE determines whether an SMTC field is present in SIB2. If the SMTC field is present, the operational flow proceeds to block 1008 where the UE applies the periodicity configured by this field and uses the rule described above in conjunction with Table 2 to set the M1 value. If the UE determines at block 1006 that the SMTC field is not present, the operational flow proceeds to block 1010 where the UE assumes the SMTC periodicity=5 ms and sets M1=1. If the UE determines at block 1004 that SIB2 was not received, the operational flow proceeds to block 1012 where the UE applies a default SIB2 (e.g., a pseudo SIB2 as discussed below in conjunction with FIG. 16), applies the SMTC configuration in the default SIB2, and then determines the M1 value accordingly.

Figure 11:
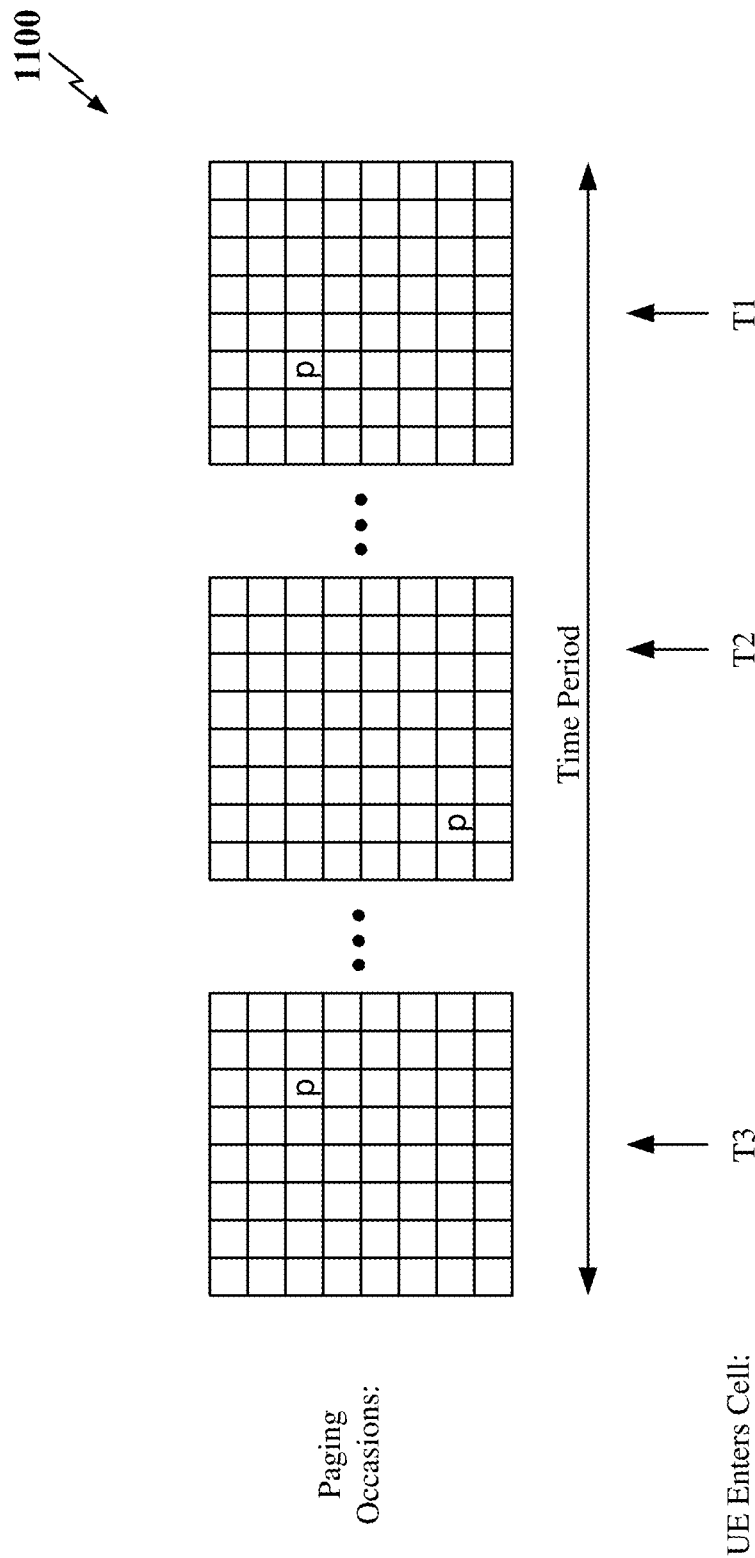
FIG. 11 is a conceptual illustration of an example of paging occasions during a period of time according to some aspects.
Figure 12:
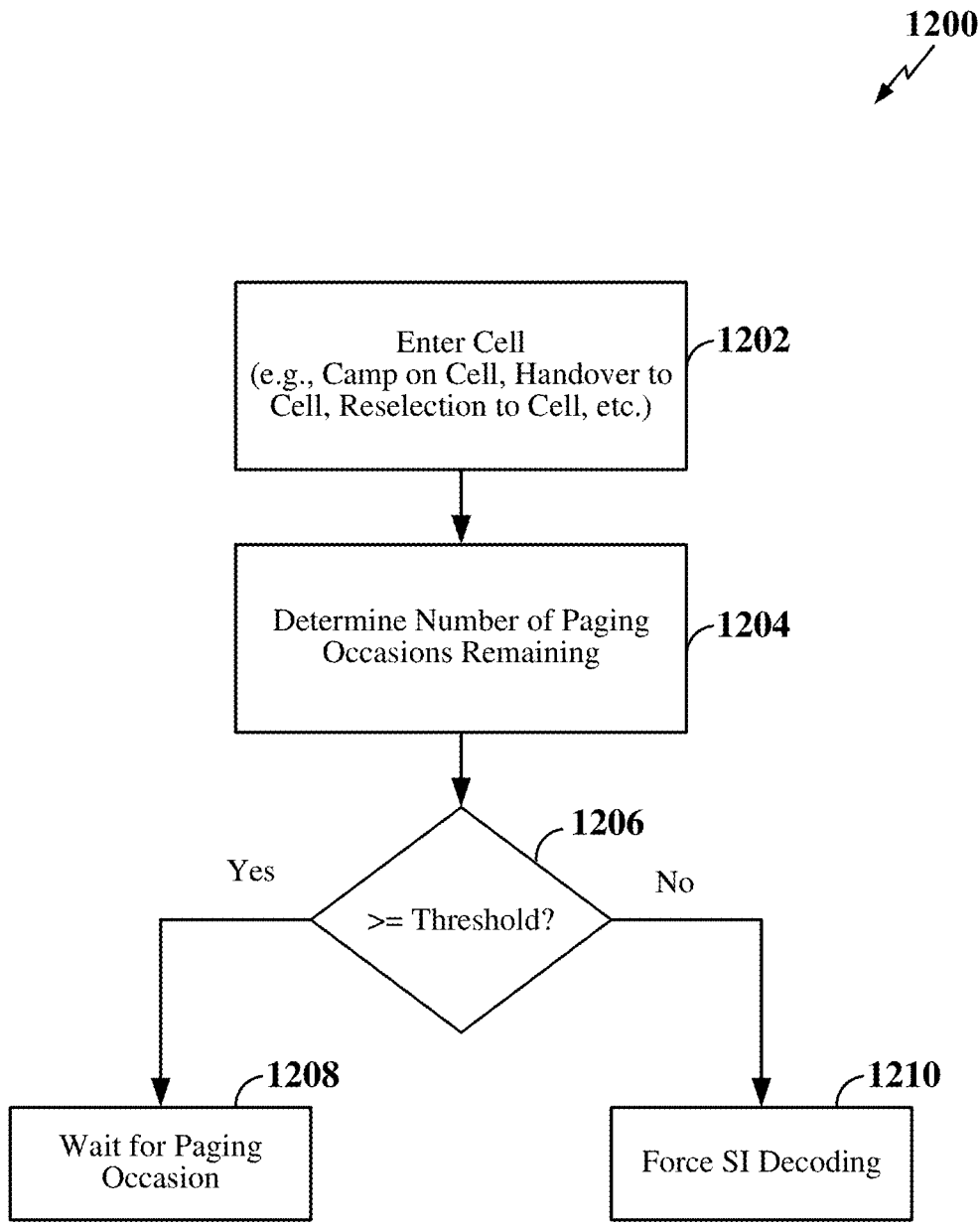
FIG. 12 is a flow chart illustrating an example of an SI decoding process according to some aspects.

Referring to FIGS. 11 and 12, techniques for acquiring SI according to some examples will be described. Paging can carry SI update indication including PWS. If a UE has entered a cell at a point which is after the paging occasion (PO), UE will not be informed of any SI updates until next time the UE receives a paging message. This can delay UE's attempt to acquire SI, especially life-critical SI (e.g., CMAS or ETWS).

FIG. 11 illustrates several examples of a UE entering a cell at different times relative to paging occasions within a time period (e.g., an SI modification period). At a time T1, there are no paging occasions (designated p) remaining for the UE. Thus, the UE will not be notified of any SI updates until the next paging time period. At a time T2, there is only one paging occasion remaining for the UE. It is possible that the UE might not be able to successfully decode the single paging occasion. Thus, the UE might not be notified of any SI updates until the next paging time period. At a time T3, there are three paging occasions remaining for the UE. Here, it is more likely that the UE will be able to successfully decode the paging occasions and determine whether there is an SI update.

The disclosure relates in some aspects to a UE detecting whether a paging occasion (PO) has passed when the UE camps on a cell. The paging occasion can be derived, for example, based on a configuration of POs, a DRX cycle, and modification period boundaries. If all or some of the paging occasions have passed, the UE may force a MIB/SIB1 decoding to acquire SI updates that the UE may have missed. For the purposes of CMAS and/or ETWS acquisition, the UE may skip the MIB and only schedule SIB1 acquisition.

In some examples, this procedure employs a best-effort approach. Accordingly, the UE may or may not a start guard timer for the MIB and the SIB1 in this case. In some examples, if the timers are started and expired, the UE may ignore any failures. In this case, the US may try to acquire MIB/SIB1 at the nearest modification period.

FIG. 12 is a flow chart illustrating an example process 1200 for monitoring for SI according to some aspects of the disclosure. Some or all illustrated features may be omitted in a particular implementation within the scope of the disclosure, and some illustrated features may not be required for implementation of all examples. In some examples, the process 1200 may be carried out by one or more of the UE 106 of FIG. 1, any of the UEs of FIG. 2, the UE 404 of FIG. 4, the UE 702 of FIG. 7 (e.g., the paging and SI acquisition processing circuitry 712), or the UE 1700 of FIG. 17. In some examples, the process 1200 may be carried out by the processing system 1714 of FIG. 17. In some examples, the process 1200 may be carried out by any suitable apparatus or means for carrying out the functions or algorithm described below.

At block 1202, UE enters a cell. In some examples, entering a cell may include idle camping, handover/redirection during connected mode, etc. At block 1204, the UE determines the number of paging occasions remaining. At block 1206, if the number of paging occasions remaining is greater than or equal to a threshold, the operation flow proceeds to block 1208 where the UE waits for the next paging occasion. If the UE determines that the number of paging occasions remaining is less than the threshold at block 1206, the operation flow proceeds to block 1210 where the UE forces SI decoding (e.g., by commencing monitoring for SI broadcast by a BS).

Figure 13:
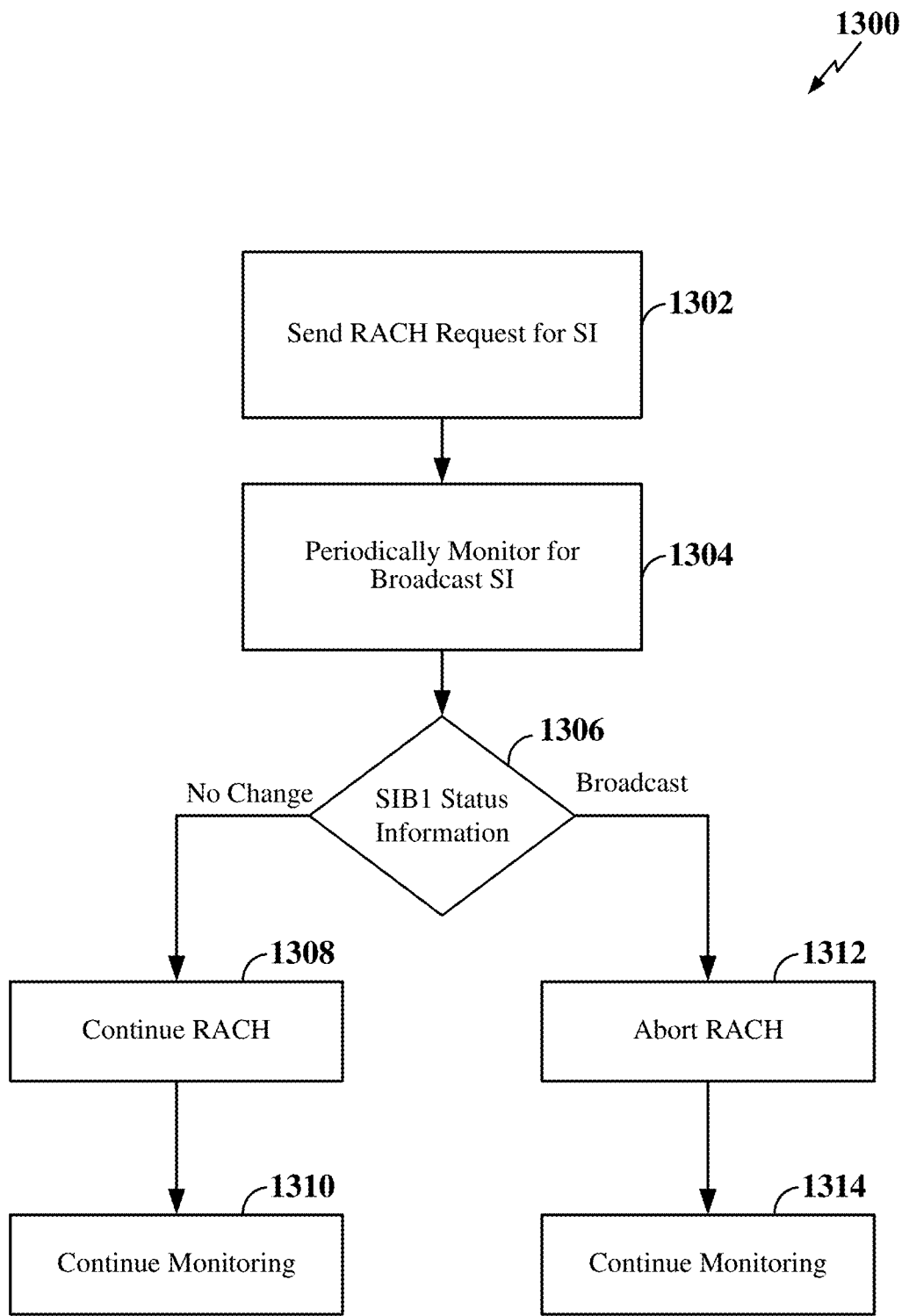
FIG. 13 is a flow chart illustrating an example of an SI request process according to some aspects.
Figure 14:
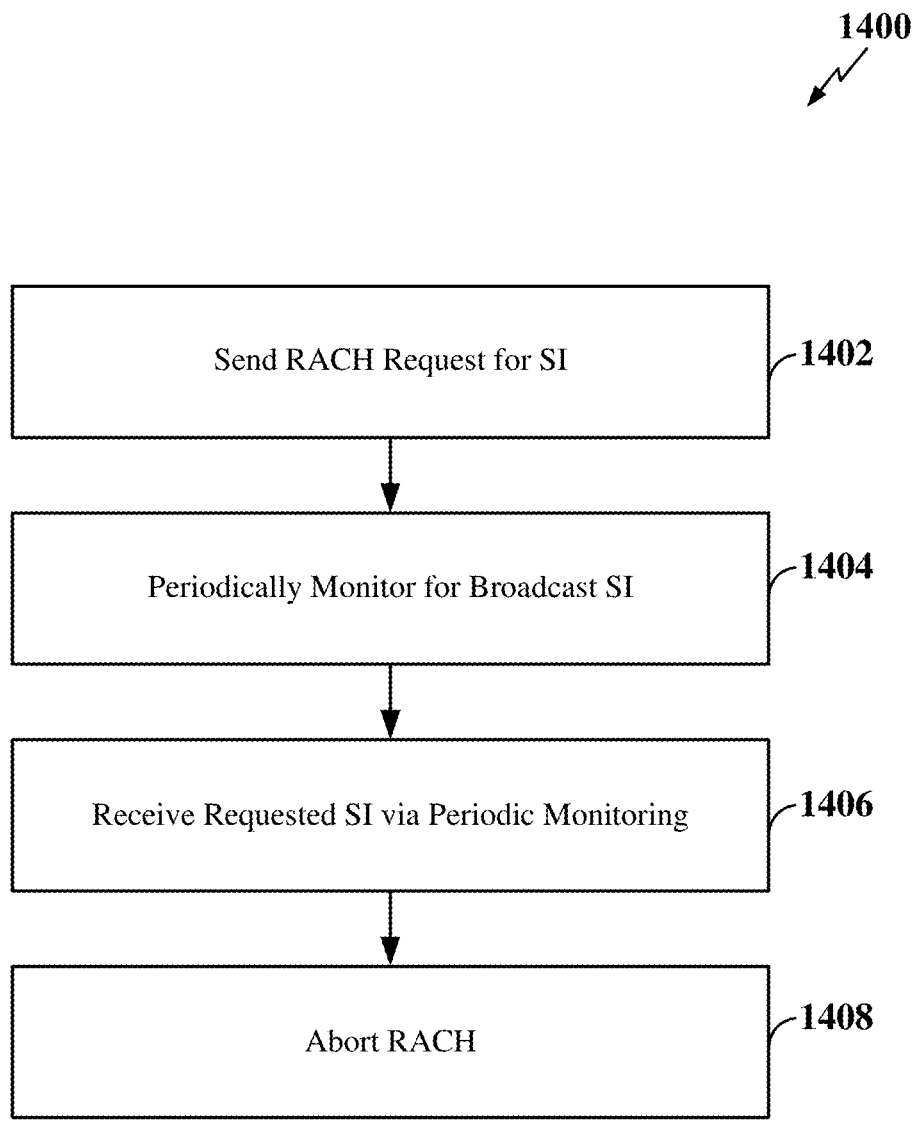
FIG. 14 is a flow chart illustrating another example of an SI request process according to some aspects.
Figure 15:
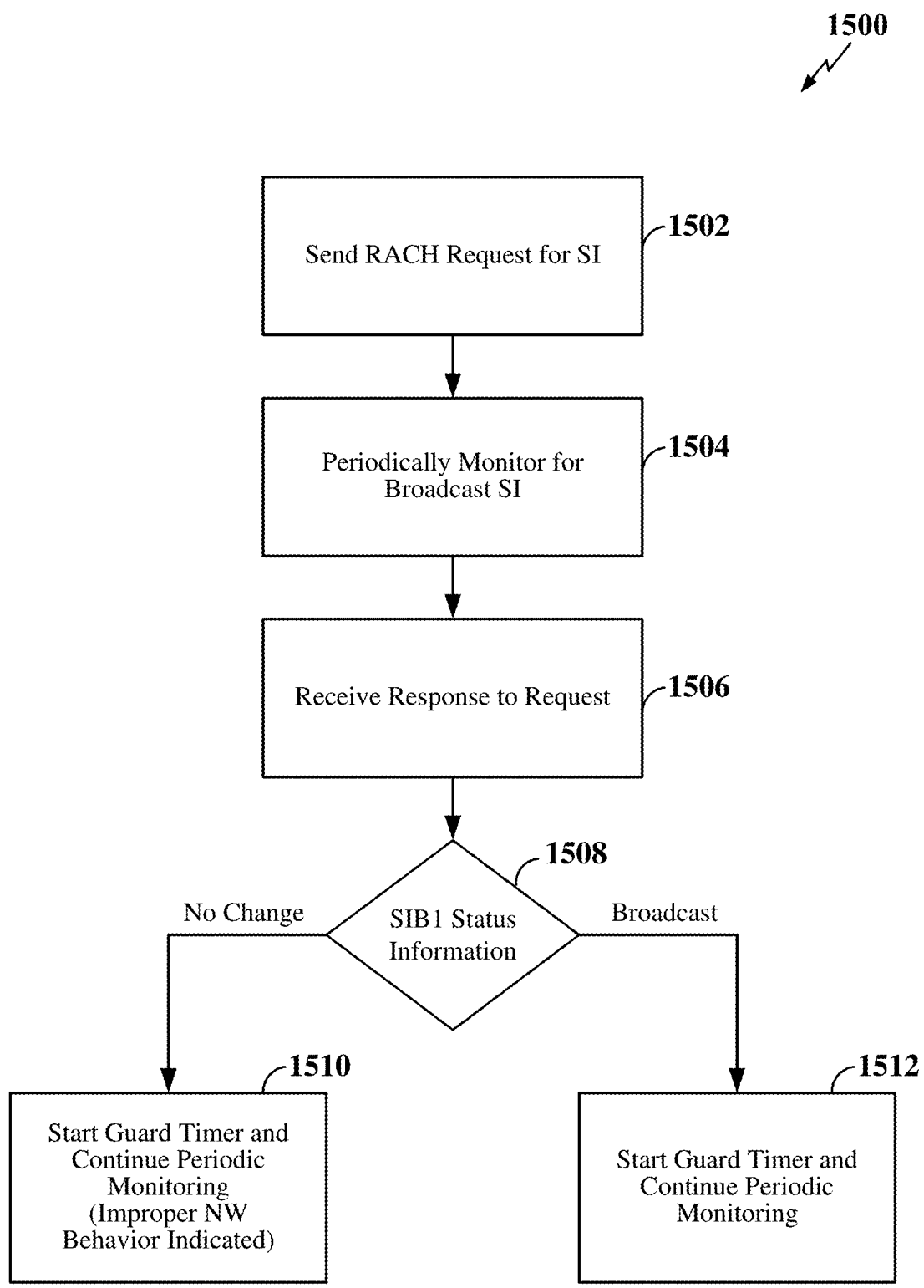
FIG. 15 is a flow chart illustrating another example of an SI request process according to some aspects.

Referring to FIGS. 13-15, techniques for acquiring SI according to some additional examples will be described. In some aspects, these examples relate to periodic monitoring in parallel with RACH on-demand SI acquisition (e.g., OSI acquisition).

For an on-demand request of OSI, a first UE may request a BS to broadcast a particular SI (e.g., only if first UE needs it). Such a request may be sent via a random access procedure (e.g., on a RACH) in some examples.

In some cases, a second UE may have successfully performed a RACH request before the BS has started broadcasting the OSI for the first UE. Thus, the BS may start broadcasting the OSI requested by the first UE before the RACH request from the first UE has completed.

Also, in some scenarios, even after a RACH is successful for a particular type of SI (SI x), the BS might not set up the broadcast indicator for SI x. In this case, the UE may send another RACH request, while missing the SI x that the BS has started transmitting.

The disclosure relates in some aspects to monitoring for SI in parallel with a RACH request so that the UE can obtain the SI as soon as possible. For example, the UE need not wait until its RACH request is completed. As another example, the UE need not wait for a broadcast indicator to monitor for the desired SI.

Table 3 illustrates example operations that may be used for parallel SI monitoring. Other operations may be used in other examples. The operations of Table 3 are described in more detail in conjunction with FIGS. 13-16 below. In some examples, operation 1 corresponds to blocks 1302 and 1304 of FIG. 13, or blocks 1402 and 1404 of FIG. 14, or blocks 1502 and 1504 of FIG. 15. In some examples, operation 2 corresponds to blocks 1302, 1304, 1306, 1308, and 1310 of FIG. 13. In some examples, operation 3 corresponds to blocks 1302, 1304, 1306, 1312, and 1314 of FIG. 13. In some examples, operation 4 corresponds FIG. 14. In some examples, operation 5 corresponds to blocks 1502, 1504, 1506, 1508, and 1512 of FIG. 15. In some examples, operation 6 corresponds to blocks 1502, 1504, 1506, 1508, and 1510 of FIG. 15.

TABLE 3

| No. | Scenarios | Operations |
| --- | --- | --- |
| 1 | RACH started/ongoing | Read SIB 1 in parallel. |
| 2 | RACH ongoing + SIB1 indicates no change of status (on-demand) | Continue RACH; Continue periodic monitoring. |
| 3 | RACH ongoing + SIB1 indicates status is broadcast (on-demand broadcast) | Abort RACH Start guard timer & continue periodic monitoring (already ongoing) |
| 4 | RACH ongoing + SI received via periodic monitoring | Abort RACH |
| 5 | RACH success (RACH CNF) + SIB 1 indicates broadcast | Start guard timer & continue periodic monitoring (already ongoing). |
| 6 | RACH success (RAC CNF) + SIB 1 indicates. No Change of status (still not broadcasting) | Start guard timer & continue periodic monitoring (already ongoing). This is bad network behavior as UE expects the BS to start broadcasting after RACH for on-demand has succeeded. |

FIG. 13 is a flow chart illustrating an example process 1300 for monitoring for SI according to some aspects of the disclosure. Some or all illustrated features may be omitted in a particular implementation within the scope of the disclosure, and some illustrated features may not be required for implementation of all examples. In some examples, the process 1300 may be carried out by one or more of the UE 106 of FIG. 1, any of the UEs of FIG. 2, the UE 404 of FIG. 4, the UE 702 of FIG. 7 (e.g., the parallel SI monitoring circuitry 714), or the UE 1700 of FIG. 17. In some examples, the process 1300 may be carried out by the processing system 1714 of FIG. 17. In some examples, the process 1300 may be carried out by any suitable apparatus or means for carrying out the functions or algorithm described below.

At block 1302, a UE sends a RACH request for SI. At block 1304, the UE also periodically monitors for broadcast SI before the RACH request is completed. At block 1306, the UE receives SIB and checks the status information therein. If, at block 1306, the status information indicates no change of status (e.g., the BS is just sending the SI on-demand), the operational flow proceeds to block 1308 where the UE continues the RACH and to block 1310 where the UE continues monitoring (e.g., periodic monitoring) for SI. If, at block 1306, the status information indicates a change of status (e.g., the SI is now broadcasting the desired SI), the operational flow proceeds to block 1312 where the UE aborts the RACH and to block 1314 where the UE continues monitoring (e.g., periodic monitoring) for SI.

FIG. 14 is a flow chart illustrating an example process 1400 for monitoring for SI according to some aspects of the disclosure. Some or all illustrated features may be omitted in a particular implementation within the scope of the disclosure, and some illustrated features may not be required for implementation of all examples. In some examples, the process 1400 may be carried out by one or more of the UE 106 of FIG. 1, any of the UEs of FIG. 2, the UE 404 of FIG. 4, the UE 702 of FIG. 7 (e.g., the parallel SI monitoring circuitry 714), or the UE 1700 of FIG. 17. In some examples, the process 1400 may be carried out by the processing system 1714 of FIG. 17. In some examples, the process 1400 may be carried out by any suitable apparatus or means for carrying out the functions or algorithm described below.

At block 1402, a UE sends a RACH request for SI. At block 1404, the UE also periodically monitors for broadcast SI before the RACH request is completed. At block 1406, the UE receives the requested SI via the periodic monitoring (e.g., the BS sent the SI in response to a RACH request from another UE). At block 1408, the UE aborts the RACH procedure.

FIG. 15 is a flow chart illustrating an example process 1500 for monitoring for SI according to some aspects of the disclosure. Some or all illustrated features may be omitted in a particular implementation within the scope of the disclosure, and some illustrated features may not be required for implementation of all examples. In some examples, the process 1500 may be carried out by one or more of the UE 106 of FIG. 1, any of the UEs of FIG. 2, the UE 404 of FIG. 4, the UE 702 of FIG. 7 (e.g., the parallel SI monitoring circuitry 714), or the UE 1700 of FIG. 17. In some examples, the process 1500 may be carried out by the processing system 1714 of FIG. 17. In some examples, the process 1500 may be carried out by any suitable apparatus or means for carrying out the functions or algorithm described below.

At block 1502, a UE sends a RACH request for SI. At block 1504, the UE also periodically monitors for broadcast SI before the RACH request is completed. At block 1506, the UE receives a response to the request. At block 1508, the UE receives SIB1 and checks the status information therein. If, at block 1508, the status information indicates no change of status (e.g., the BS is just sending the SI on-demand), the operational flow proceeds to block 1510 where the UE may start a guard timer and continue periodic monitoring. Here, the UE may send a notification that there is improper network behavior. If, at block 1508, the status information indicates a change of status (e.g., the BS indicates that it is now broadcasting the desired SI), the operational flow proceeds to block 1512 where the UE may start a guard timer and continue periodic monitoring.

Figure 16:
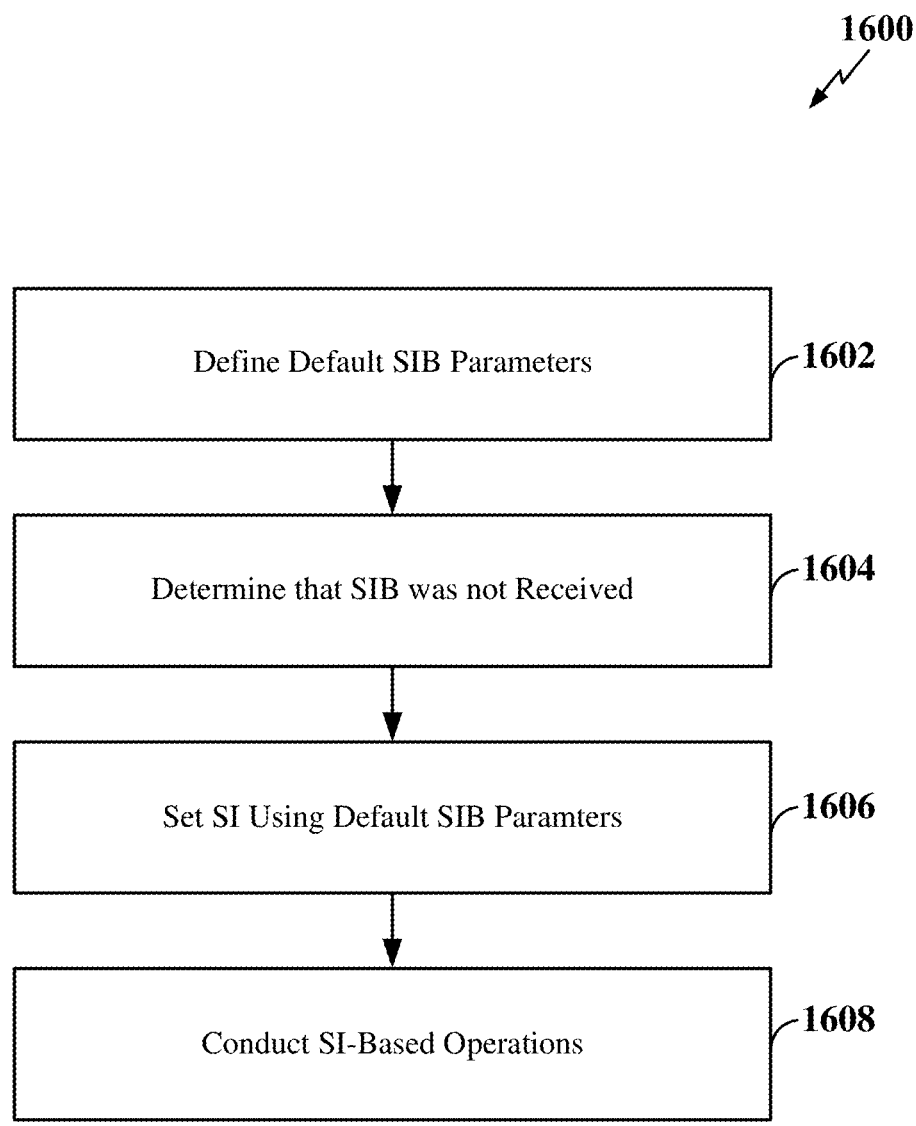
FIG. 16 is a flow chart illustrating an example of a process that uses default SI according to some aspects.

Referring to FIG. 16, techniques for using default SI according to some examples will be described. In some aspects, these techniques may relate to using a default SIB (e.g., a pseudo SIB2) to facilitate cell reselection.

In some aspects, SIB2 may be a relevant SIB for a UE to perform reselection. SIB2 contains cell re-selection information common for intra-frequency, inter-frequency and/or inter-RAT cell re-selection. However, a UE might not acquire SIB2 in several scenarios. As one example, SIB1 might not provide scheduling information for SIB2. As another example, SIB1 may include scheduling information for SIB2, but the UE is unable to acquire SIB2 (e.g., before the UE's guard timer expires, or after RACH fails if SIB2 is an on-demand SI).

In the above scenario, a UE may elect to use a pseudo SIB2 right away (e.g., rather than waiting for a successful receipt of the SIB2 broadcast by the BS). In some examples, a pseudo SIB2 may include a set of default configurations that accelerates the reselection away from the current serving gNB as soon as possible. For example, this may involve setting the lowest priority to the serving layer, setting Treselection=0, and so on. Furthermore, once a UE is reselected out of the current serving BS, the UE can bar the corresponding cell based on the cell identity (e.g., a cellIdentity parameter) of the cell for a period of time. The UE may elect to increase the barring time if the same symptom is seen repeatedly.

In some examples, a pseudo SIB2 may be used to dynamically configure a serving cell's reselection priority based on the UE's camping history. For example, if there are other cells on the same frequency that the UE used to camp successfully and the UE acquired an actual SIB2 at such a cell, the pseudo SIB2 may be configured to specify the reselection priority configured by the actual SIB2 from the other cell(s). If there are multiple cells on the same absolute radio frequency channel number (ARFCN) in the SIB database, the priority configuration from the most recently camped cell may be used. Otherwise, if the UE did not acquire a SIB2 from another cell, the reselection priority of the pseudo SIB2 may be set to a default value of 0 (e.g., as discussed above). Advantageously, the above approach reflects a real network deployment and configuration and, to some extent, may balance the choices between staying on a serving RAT such as NR (when reselection priority is not as low as 0, the UE may not reselect too easily away) and moving to other RAT such as LTE.

The disclosure relates in some aspects to using similar techniques for other types of SI (e.g., SIB3/4/5, etc.). If the UE is unable to acquire one or more of these other types of SI from the BS, the UE can apply a corresponding pseudo version of that SI.

RACH may be repeated #rach_cnt times before UE considers it as a failure. In between every two RACHs, a UE can wait for a gap time of wait_time_rach. The #rach_cnt parameter is configurable, e.g., #rach_cnt=3. The wait_time_rach parameter is also configurable, e.g., wait_time_rach=1 second.

The techniques described herein may contribute to overall enhanced UE device performance and user experience. In some examples, a UE may experience reduced latency in acquiring SI (e.g., SI that the UE requires). In some examples, a UE may be able to expedite the acquisition of any SI updates (e.g., for PWS, etc.). In some examples, a UE may experience one or more of an increase in the robustness and the success rate in acquiring SI, a reduction in UE standby power, a reduction in UE processing load, improved mobility in idle/inactive mode, or a reduction in the out-of-service rate.

FIG. 16 is a flow chart illustrating an example process 1600 for using a guard timer when monitoring for SI according to some aspects of the disclosure. Some or all illustrated features may be omitted in a particular implementation within the scope of the disclosure, and some illustrated features may not be required for implementation of all examples. In some examples, the process 1600 may be carried out by one or more of the UE 106 of FIG. 1, any of the UEs of FIG. 2, the UE 404 of FIG. 4, the UE 702 of FIG. 7 (e.g., the SI guard timer and failure processing circuitry 710), or the UE 1700 of FIG. 17. In some examples, the process 1600 may be carried out by the processing system 1714 of FIG. 17. In some examples, the process 1600 may be carried out by any suitable apparatus or means for carrying out the functions or algorithm described below.

At block 1602, a UE defines default SIB parameters (e.g., for a pseudo SIB). At block 1604, the UE determines that a SIB (e.g. SIB2, etc.) was not received. At block 1606, the UE sets its SI (e.g., the SI information corresponding to SIB2) using the default SIB parameters. As discussed herein, the parameters may expedite reselection to another cell. At block 1608, the UE conducts its SI-related operations based on the default SIB parameters. For example, the UE may immediately reselect to another cell.

Figure 17:
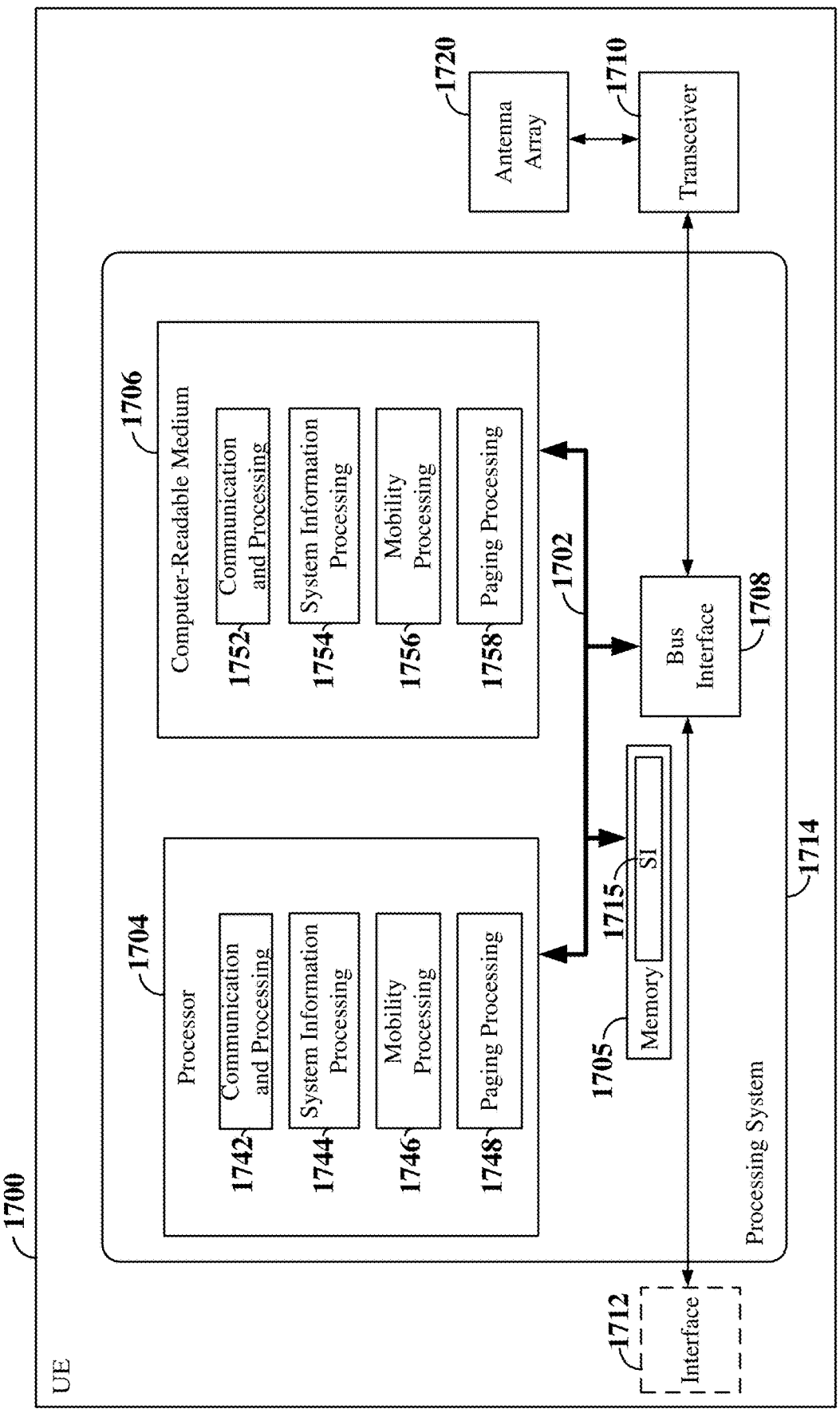
FIG. 17 is a block diagram conceptually illustrating an example of a hardware implementation for a user equipment employing a processing system according to some aspects.

FIG. 17 is a block diagram illustrating an example of a hardware implementation for a UE 1700 employing a processing system 1714. For example, the UE 1700 may be a device configured to wirelessly communicate with a base station, as discussed in any one or more of FIGS. 1-16. In some implementations, the UE 1700 may correspond to any of the UEs or scheduled entities shown in any of FIGS. 1, 2, 4, and 7.

In accordance with various aspects of the disclosure, an element, or any portion of an element, or any combination of elements may be implemented with the processing system 1714. The processing system 1714 may include one or more processors 1704. Examples of processors 1704 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1700 may be configured to perform any one or more of the functions described herein. That is, the processor 1704, as utilized in a UE 1700, may be used to implement any one or more of the processes and procedures described herein.

The processor 1704 may in some instances be implemented via a baseband or modem chip and in other implementations, the processor 1704 may include a number of devices distinct and different from a baseband or modem chip (e.g., in such scenarios as may work in concert to achieve the examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1714 may be implemented with a bus architecture, represented generally by the bus 1702. The bus 1702 may include any number of interconnecting buses and bridges depending on the specific application of the processing system 1714 and the overall design constraints. The bus 1702 communicatively couples together various circuits including one or more processors (represented generally by the processor 1704), a memory 1705, and computer-readable media (represented generally by the computer-readable medium 1706). The bus 1702 may also link various other circuits such as timing sources, peripherals, voltage regulators, and power management circuits, which are well known in the art, and therefore, will not be described any further. A bus interface 1708 provides an interface between the bus 1702 and a transceiver 1710 coupled to an antenna array 1720 and between the bus 1702 and an interface 1730. The transceiver 1710 provides a communication interface or means for communicating with various other apparatus over a wireless transmission medium. In some examples, the UE may include two or more transceivers 1710, each configured to communicate with a respective network type (e.g., terrestrial or non-terrestrial). The interface 1730 provides a communication interface or means of communicating with various other apparatuses and devices (e.g., other devices housed within the same apparatus as the UE or other external apparatuses) over an internal bus or external transmission medium, such as an Ethernet cable. Depending upon the nature of the apparatus, the interface 1730 may include a user interface (e.g., keypad, display, speaker, microphone, joystick). Of course, such a user interface is optional, and may be omitted in some examples, such as an IoT device.

The processor 1704 is responsible for managing the bus 1702 and general processing, including the execution of software stored on the computer-readable medium 1706. The software, when executed by the processor 1704, causes the processing system 1714 to perform the various functions described below for any particular apparatus. The computer-readable medium 1706 and the memory 1705 may also be used for storing data that is manipulated by the processor 1704 when executing software. For example, the memory 1705 may store SI information 1715 used by the processor 1704 for the SI-related operations described herein.

One or more processors 1704 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1706.

The computer-readable medium 1706 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1706 may reside in the processing system 1714, external to the processing system 1714, or distributed across multiple entities including the processing system 1714. The computer-readable medium 1706 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The UE 1700 may be configured to perform any one or more of the operations described herein (e.g., as described above in conjunction with FIGS. 1-16 and as described below in conjunction with FIGS. 18-22). In some aspects of the disclosure, the processor 1704, as utilized in the UE 1700, may include circuitry configured for various functions.

The processor 1704 may include communication and processing circuitry 1741. The communication and processing circuitry 1741 may be configured to communicate with a base station, such as a gNB. The communication and processing circuitry 1741 may include one or more hardware components that provide the physical structure that performs various processes related to wireless communication (e.g., signal reception and/or signal transmission) as described herein. The communication and processing circuitry 1741 may further include one or more hardware components that provide the physical structure that performs various processes related to signal processing (e.g., processing a received signal and/or processing a signal for transmission) as described herein. In some examples, the communication and processing circuitry 1741 may include two or more transmit/receive chains, each configured to process signals in a different RAT (or RAN) type. The communication and processing circuitry 1741 may further be configured to execute communication and processing software 1751 included on the computer-readable medium 1706 to implement one or more functions described herein.

In some implementations where the communication involves receiving information, the communication and processing circuitry 1741 may obtain information from a component of the UE 1700 (e.g., from the transceiver 1710 that receives the information via radio frequency signaling or some other type of signaling suitable for the applicable communication medium), process (e.g., decode) the information, and output the processed information. For example, the communication and processing circuitry 1741 may output the information to another component of the processor 1704, to the memory 1705, or to the bus interface 1708. In some examples, the communication and processing circuitry 1741 may receive one or more of signals, messages, other information, or any combination thereof. In some examples, the communication and processing circuitry 1741 may receive information via one or more channels. In some examples, the communication and processing circuitry 1741 may include functionality for a means for receiving. In some examples, the communication and processing circuitry 1741 may include functionality for a means for decoding.

In some implementations where the communication involves sending (e.g., transmitting) information, the communication and processing circuitry 1741 may obtain information (e.g., from another component of the processor 1704, the memory 1705, or the bus interface 1708), process (e.g., encode) the information, and output the processed information. For example, the communication and processing circuitry 1741 may output the information to the transceiver 1710 (e.g., that transmits the information via radio frequency signaling or some other type of signaling suitable for the applicable communication medium). In some examples, the communication and processing circuitry 1741 may send one or more of signals, messages, other information, or any combination thereof. In some examples, the communication and processing circuitry 1741 may send information via one or more channels. In some examples, the communication and processing circuitry 1741 may include functionality for a means for sending (e.g., a means for transmitting). In some examples, the communication and processing circuitry 1741 may include functionality for a means for encoding.

The processor 1704 may further include system information processing circuitry 1744, which may, in some examples, be configured to perform one or more of the system information-related operations described herein (e.g., including those described in conjunction with FIGS. 7-16 and 18-22). In some examples, the system information processing circuitry 1744 may correspond to the system information processing circuitry 708 of FIG. 7. In some examples, the system information processing circuitry 1744 may correspond to the SI guard timer and failure processing circuitry 710 of FIG. 7. In some examples, the system information processing circuitry 1744 may correspond to the paging and SI acquisition processing circuitry 712 of FIG. 7. In some examples, the system information processing circuitry 1744 may correspond to the parallel SI monitoring circuitry 714 of FIG. 7. In some examples, the system information processing circuitry 1744 may correspond to the default SIB processing circuitry 716 of FIG. 7. In some examples, the system information processing circuitry 1744 may include functionality for a means for monitoring for system information. In some examples, the system information processing circuitry 1744 may include functionality for a means for determining that system information was not received. In some examples, the system information processing circuitry 1744 may include functionality for a means for monitoring for system information. In some examples, the system information processing circuitry 1744 may include functionality for a means for sending a request for system information. In some examples, the system information processing circuitry 1744 may include functionality for a means for determining that system information was not acquired. In some examples, the system information processing circuitry 1744 may include functionality for a means for setting at least one parameter. The system information processing circuitry 1744 may further be configured to execute system information processing software 1754 included on the computer-readable medium 1706 to implement one or more functions described herein.

The processor 1704 may further include mobility processing circuitry 1746, which may, in some examples, be configured to perform one or more of the mobility-related operations described herein (e.g., including those described in conjunction with FIGS. 7-9, 11, 18, 21, and 22). In some examples, the mobility processing circuitry 1746 may correspond to the system information processing circuitry 708 of FIG. 7. In some examples, the mobility processing circuitry 1746 may correspond to the SI guard timer and failure processing circuitry 710 of FIG. 7. In some examples, the mobility processing circuitry 1746 may correspond to the paging and SI acquisition processing circuitry 712 of FIG. 7. In some examples, the mobility processing circuitry 1746 may correspond to the default SIB processing circuitry 716 of FIG. 7. In some examples, the mobility processing circuitry 1746 may include functionality for means for conducting a failure procedure. In some examples, the mobility processing circuitry 1746 may include functionality for means for entering coverage of a cell. In some examples, the mobility processing circuitry 1746 may include functionality for means for setting at least one parameter. The mobility processing circuitry 1746 may further be configured to execute mobility processing software 1756 included on the computer-readable medium 1706 to implement one or more functions described herein.

The processor 1704 may further include paging processing circuitry 1748, which may, in some examples, be configured to perform one or more of the paging-related operations described herein (e.g., including those described in conjunction with FIGS. 7, 11, 12, 19, and 20). In some examples, the paging processing circuitry 1748 may correspond to the system information processing circuitry 708 of FIG. 7. In some examples, the paging processing circuitry 1748 may correspond to the paging and SI acquisition processing circuitry 712 of FIG. 7. In some examples, the paging processing circuitry 1748 may include functionality for a means for determining that there are no paging occasions and/or a means for determining that a quantity of paging occasions is less than or equal to a threshold. The paging processing circuitry 1748 may further be configured to execute paging processing software 1758 included on the computer-readable medium 1706 to implement one or more functions described herein.

Figure 18:
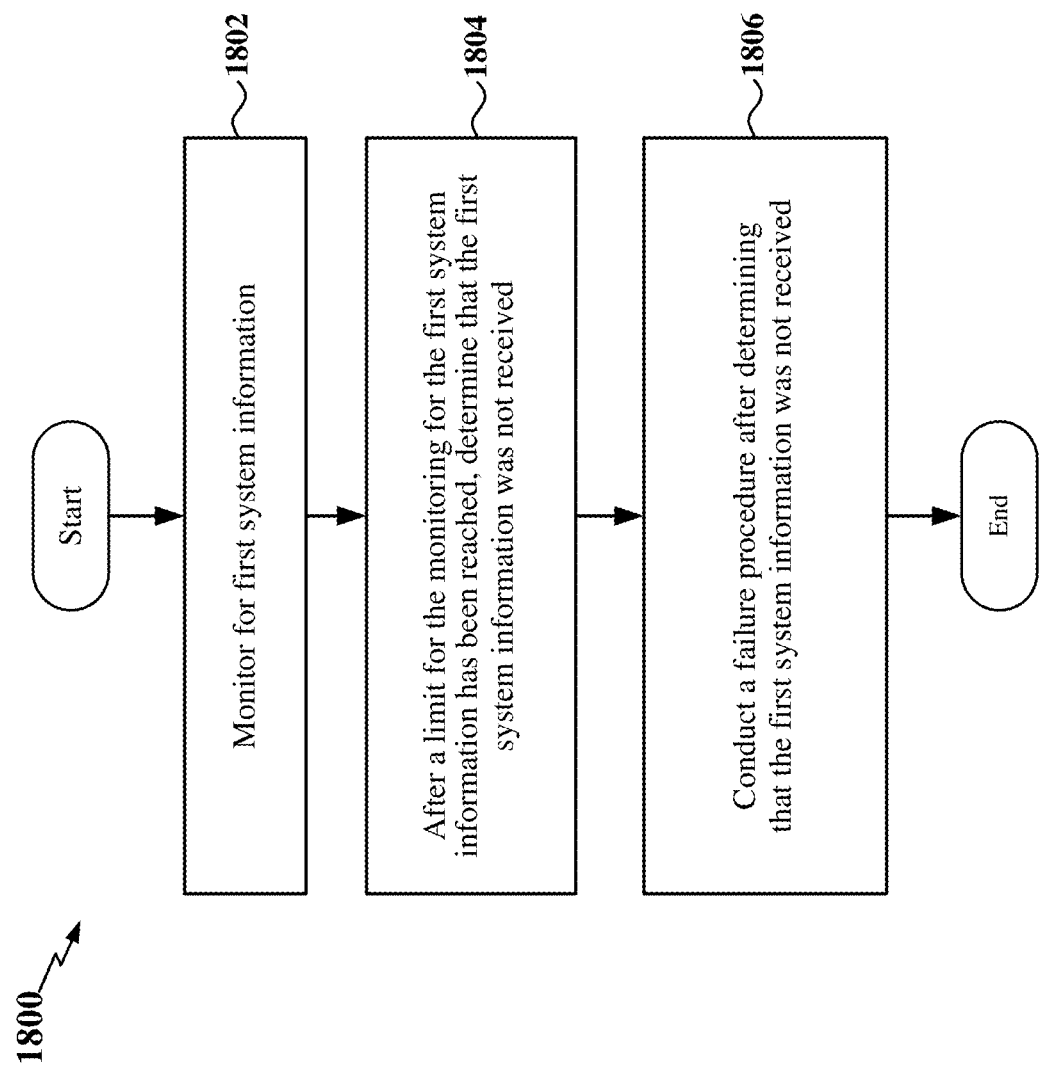
FIG. 18 is a flow chart illustrating an example of a wireless communication process for monitoring SI according to some aspects.

FIG. 18 is a flow chart illustrating an example process 1800 for a wireless communication system according to some aspects of the disclosure. As described below, some or all illustrated features may be omitted in a particular implementation within the scope of the disclosure, and some illustrated features may not be required for implementation of all examples. In some examples, the process 1800 may be carried out by one or more of the UE 1700 illustrated in FIG. 17, the UE 106 of FIG. 1, any of the UEs of FIG. 2, the UE 404 of FIG. 4, or the UE 702 of FIG. 7. In some examples, the process 1800 may be carried out by the processing system 1714 of FIG. 17. In some examples, the process 1800 may be carried out by any suitable apparatus or means for carrying out the functions or algorithm described below.

At block 1802, a UE may monitor for first system information. In some examples, the first system information may be a default system information block, a system information block 2 (SIB2), or a default SIB2. For example, the system information processing circuitry 1744 together with the communication and processing circuitry 1742 and the transceiver 1710, shown and described above in connection with FIG. 17, may monitor a designated resource (e.g., a PBCH resource) for SI transmissions by a gNB.

At block 1804, the UE may, after a limit for the monitoring for the first system information has been reached, determining that the first system information was not received. In some examples, the limit may be based on the type of the first system information. In some examples, the limit may be a time limit or a count. For example, the system information processing circuitry 1744 may start a timer or a counter (e.g., with a timer or counter value that is based on the type of SI being monitored) when commencing the monitoring for SI and determine, once the timer or counter has expired, whether SI was successfully received.

In some examples, determining that the first system information was not received may include determining the type of the first system information, and selecting the limit from a plurality of limits based on the type of the system information. In some examples, the plurality of limits may include a first time limit for a first type of system information, and a second time limit for a second type of system information. In some examples, the second time limit may be longer than the first time limit. In some examples, the first time limit may include a multiple of a system information periodicity, the second time limits may include a maximum value selected from a first value and a second value, the first value may include a multiple of the system information periodicity, and the second value may include a multiple of a discontinuous reception (DRX) cycle length.

In some examples, determining that the first system information was not received may include starting a timer in conjunction with commencing the monitoring for system information, and determining that the first system information is not received prior to expiration of the timer. In some examples, the limit may include a count. In some examples, the count corresponds to a period of time. In some examples, determining that the first system information was not received may include starting a counter in conjunction with commencing the monitoring for system information, and determining that the first system information is not received prior to the counter reaching the count. In some examples, determining that the first system information was not received may include determining the type of the first system information, and selecting the count from a plurality of counts based on the type of the system information. In some examples, the plurality of counts may include a first count for a first type of system information, and a second count for a second type of system information, wherein the second count may be different from the first count.

In some examples, determining that the first system information of the cell was not received may include determining that second system information of the cell does not include scheduling information for the first system information. In some examples, determining that the first system information of the cell was not received may include determining that a timer associated with acquisition of the first system information expired. In some examples, determining that the first system information of the cell was not received may include determining that a random access procedure for acquiring the first system information failed.

At block 1806, the UE may conduct a failure procedure after (e.g., as a result of) determining that the first system information was not received. In some examples, the failure procedure is based on a type of the first system information.

For example, the mobility processing circuitry 1746, shown and described above in connection with FIG. 17, may select a failure procedure (e.g., radio link failure or cell reselection) designated for the particular type of SI being monitored.

In some examples, conducting a failure procedure after determining that the first system information is not received may include determining the type of the first system information, and selecting the failure procedure from a plurality of failure procedures based on the type of the first system information. In some examples, the plurality of failure procedures may include a first failure procedure for a first type of system information, and a second failure procedure for a second type of system information. In some examples, the first failure procedure may include initiating a radio link failure, and the second failure procedure may include immediate cell reselection. In some examples, the first failure procedure may include barring reselection to a cell for a period of time, and the second failure procedure may include immediate cell reselection. In some examples, the limit may be based on a discontinuous reception (DRX) cycle length multiplied by a parameter. In some examples, the process may further include determining whether second system information has been received, and setting the parameter to a particular value after (e.g., as a result of) determining whether the second system information has been received. In some examples, the process may further include determining whether a synchronization signal block measurement time configuration (SMTC) field is present, and setting the parameter to a particular value after (e.g., as a result of) determining whether the SMTC field is present. In some examples, the process may further include determining that second system information has not been received, and setting the parameter to a value of 1 after (e.g., as a result of) determining that the second system information has not been received. In some examples, the process may further include determining that second system information has been received, determining that a synchronization signal block measurement time configuration (SMTC) field is absent from the second system information, and setting the parameter to a value of 1 after (e.g., as a result of) determining that the second system information has been received and determining that the SMTC field is absent. In some examples, the process may further include determining that second system information has not been received, determining a synchronization signal block measurement time configuration (SMTC) from a default system information block after (e.g., as a result of) determining that second system information has not been received, and setting the parameter based on the SMTC.

In some examples, the process may further include determining a type of the first system information. In some examples, the process may further include selecting the limit from a plurality of limits based on the type of the first system information, wherein the plurality of limits may include a first time limit for a first type of system information and a second time limit for a second type of system information. In some examples, the first time limit may include a multiple of a system information periodicity, the second time limit may include a maximum value selected from a first value and a second value, the first value may include a multiple of the system information periodicity, and the second value may include a multiple of a discontinuous reception (DRX) cycle length.

In some examples, the limit is a time limit. In some examples, the process may further include starting a timer in conjunction with commencing the monitoring for the first system information. In some examples, determining that the first system information was not received may include determining that the first system information was not received prior to expiration of the timer.

In some examples, the limit is a count. In some examples, the process may further include starting a counter in conjunction with commencing the monitoring for the first system information. In some examples, determining that the first system information was not received may include determining that the first system information was not received prior to the counter reaching the count.

In some examples, the limit is a count. In some examples, the process may further include determining a type of the first system information and selecting the count from a plurality of counts based on the type of the system information. In some examples, the plurality of counts includes a first count for a first type of system information and a second count for a second type of system information.

In some examples, the process may further include determining a type of the first system information, and selecting the failure procedure from a plurality of failure procedures based on the type of the first system information, wherein the plurality of failure procedures may include a first failure procedure for a first type of system information and a second failure procedure for a second type of system information. In some examples, the first failure procedure may include initiating a radio link failure and the second failure procedure comprises immediate cell reselection. In some examples, the first failure procedure may include barring reselection to a cell for a period of time and the second failure procedure comprises immediate cell reselection.

In some examples, the limit is based on a discontinuous reception (DRX) cycle length multiplied by a parameter. In some examples, the process may further include determining whether second system information has been received, and setting the parameter to a particular value after determining whether the second system information has been received.

In some examples, the limit is based on a discontinuous reception (DRX) cycle length multiplied by a parameter. In some examples, the process may further include determining whether the user equipment has received a synchronization signal block measurement time configuration (SMTC), and setting the parameter to a particular value after determining whether the SMTC field is present.

In some examples, the process may further include communicating via a first cell of a base station. In some examples, the process may further include setting at least one parameter in a first system information block to invoke cell reselection to a second cell as a result of the determination that the first system information was not received.

In some examples, the at least one parameter includes a serving layer parameter. In some examples, the process may further include setting the serving layer parameter to a lowest priority of a plurality of priorities as a result of the determination that the first system information was not received.

In some examples, the at least one parameter includes a Treselection parameter. In some examples, the process may further include setting the Treselection parameter to 0 as a result of the determination that the first system information was not received.

In some examples, the at least one parameter includes a cell reselection priority. In some examples, the process may further include setting the cell reselection priority based on at least one cell reselection priority that the user equipment acquired when camping on at least one cell other than the first cell.

In some examples, the process may further include barring reselection to the first cell for a period of time after (e.g., as a result of) determining that the first system information of the cell was not received.

Figure 19:
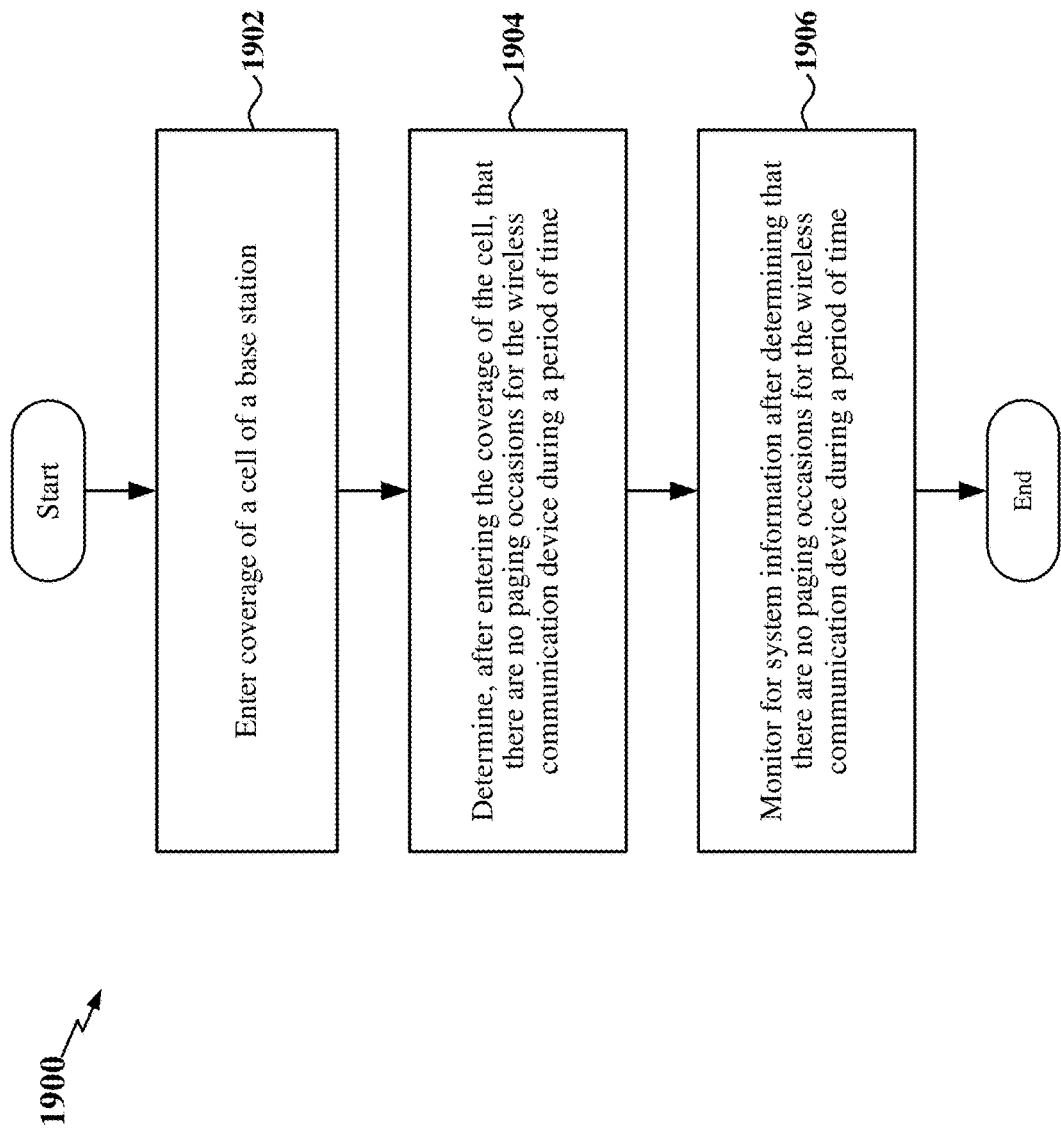
FIG. 19 is a flow chart illustrating another example of a wireless communication process for monitoring SI according to some aspects.

FIG. 19 is a flow chart illustrating an example process 1900 for a wireless communication system according to some aspects of the disclosure. As described below, some or all illustrated features may be omitted in a particular implementation within the scope of the disclosure, and some illustrated features may not be required for implementation of all examples. In some examples, the process 1900 may be carried out by one or more of the UE 1700 illustrated in FIG. 17, the UE 106 of FIG. 1, any of the UEs of FIG. 2, the UE 404 of FIG. 4, or the UE 702 of FIG. 7. In some examples, the process 1900 may be carried out by the processing system 1714 of FIG. 17. In some examples, the process 1900 may be carried out by any suitable apparatus or means for carrying out the functions or algorithm described below.

At block 1902, a UE may enter coverage of a cell of a base station. As used herein, the term entering coverage of a cell refers to a communication operation. For example, entering the coverage of the cell may include camping on the cell, a handover to the cell, a redirection to the cell, or some other communication operation. For example, the communication and processing circuitry 1742 and the transceiver 1710, shown and described above in connection with FIG. 17, may detect signals (e.g., synchronization signals such as PSS and SSS) transmitted by a gNB.

At block 1904, the UE may determine, after (e.g., as a result of) entering the coverage of the cell, that there are no paging occasions for the UE during a period of time. In some examples, the period of time may be based on at least one of a discontinuous reception (DRX) cycle, a system information modification period, a duration of a paging frame, or a combination thereof. For example, the paging processing circuitry 1748, shown and described above in connection with FIG. 17, may determine based on a paging configuration for the UE (e.g., paging resources allocated for the UE) whether any paging opportunities for the UE will occur within a system information modification period.

In some examples, determining, after entering the coverage of the cell that there are no paging occasions for the UE during a period of time may include determining that there are no paging occasions for the UE during a system information modification period.

At block 1906, the UE may monitor for system information after (e.g., as a result of) determining that there are no paging occasions for the UE during a period of time. For example, the system information processing circuitry 1744 together with the communication and processing circuitry 1742 and the transceiver 1710, shown and described above in connection with FIG. 17, may proactively monitor a designated resource for SI transmissions by a gNB instead of waiting for a page that would indicate whether SI has been changed.

In some examples, the system information may include at least one of a system frame number, a subcarrier spacing, a subcarrier offset, reference signal information, system information scheduling, reselection information, or a combination thereof. In some examples, the system information may include a master information block. In some examples, the system information may include at least one of cell selection information, cell configuration information, system information scheduling, public warning system information, or a combination thereof. In some examples, the system information may include a system information block 1 (SIB1).

Figure 20:
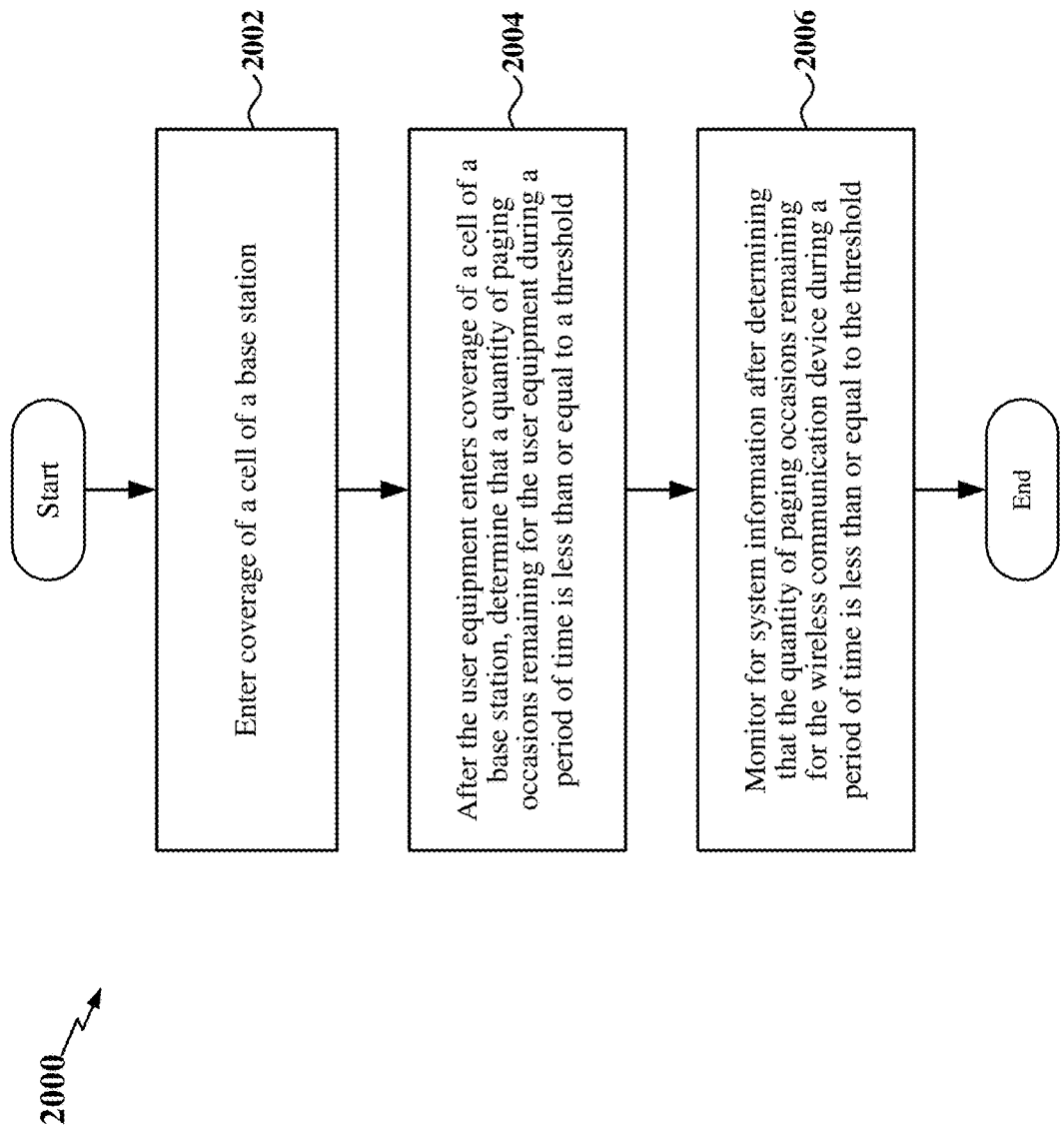
FIG. 20 is a flow chart illustrating another example of a wireless communication process for monitoring SI according to some aspects.

FIG. 20 is a flow chart illustrating an example process 2000 for a wireless communication system according to some aspects of the disclosure. As described below, some or all illustrated features may be omitted in a particular implementation within the scope of the disclosure, and some illustrated features may not be required for implementation of all examples. In some examples, the process 2000 may be carried out by one or more of the UE 1700 illustrated in FIG. 17, the UE 106 of FIG. 1, any of the UEs of FIG. 2, the UE 404 of FIG. 4, or the UE 702 of FIG. 7. In some examples, the process 2000 may be carried out by the processing system 1714 of FIG. 17. In some examples, the process 2000 may be carried out by any suitable apparatus or means for carrying out the functions or algorithm described below.

At block 2002, a UE may enter coverage of a cell of a base station. In some examples, the user equipment entering coverage of the cell may include the user equipment camping on the cell, a handover of the user equipment to the cell, or a redirection of the user equipment to the cell. For example, the communication and processing circuitry 1742 and the transceiver 1710, shown and described above in connection with FIG. 17, may detect signals (e.g., synchronization signals such as PSS and SSS) transmitted by a gNB.

At block 2004, the UE may determine, after (e.g., as a result of) the UE enters coverage of a cell of a base station, that a quantity of paging occasions remaining for the UE during a period of time is less than or equal to a threshold. For example, the paging processing circuitry 1748, shown and described above in connection with FIG. 17, may determine based on a paging configuration how many (e.g., 0, 1, 2, etc.) paging opportunities for the UE will occur within a system information modification period and compare the determined quantity to a threshold (e.g., a value of 0, 1, 2, etc.).

In some examples, the period of time is a system information modification period. In some examples, the period of time may be based on at least one of a discontinuous reception (DRX) cycle, a system information modification period, a duration of a paging frame, or a combination thereof.

In some examples, determining, after entering the coverage of the cell, that a quantity of paging occasions remaining for the UE during a period of time is less than or equal to a threshold may include determining that a quantity of paging occasions remaining for the UE during a system information modification period is less than or equal to a threshold.

At block 2006, the UE may monitor for system information after (e.g., as a result of) determining that the quantity of paging occasions remaining for the UE during a period of time is less than or equal to the threshold. In some examples, the system information may include a master information block, a system information block 1 (SIB1), or a combination thereof. For example, the system information processing circuitry 1744 together with the communication and processing circuitry 1742 and the transceiver 1710, shown and described above in connection with FIG. 17, may proactively monitor a designated resource for SI transmissions by a gNB instead of waiting for a page that would indicate whether SI has been changed.

In some examples, the threshold has a value of 0. In some examples, the period of time is a system information modification period. In some examples, the process may further include monitoring for the system information after determining that there are no paging occasions for the user equipment during the system information modification period.

In some examples, the system information may include at least one of a system frame number, a subcarrier spacing, a subcarrier offset, reference signal information, system information scheduling, reselection information, or a combination thereof. In some examples, the system information may include a master information block. In some examples, the system information may include at least one of cell selection information, cell configuration information, system information scheduling, public warning system information, or a combination thereof. In some examples, the system information may include a system information block 1 (SIB1).

Figure 21:
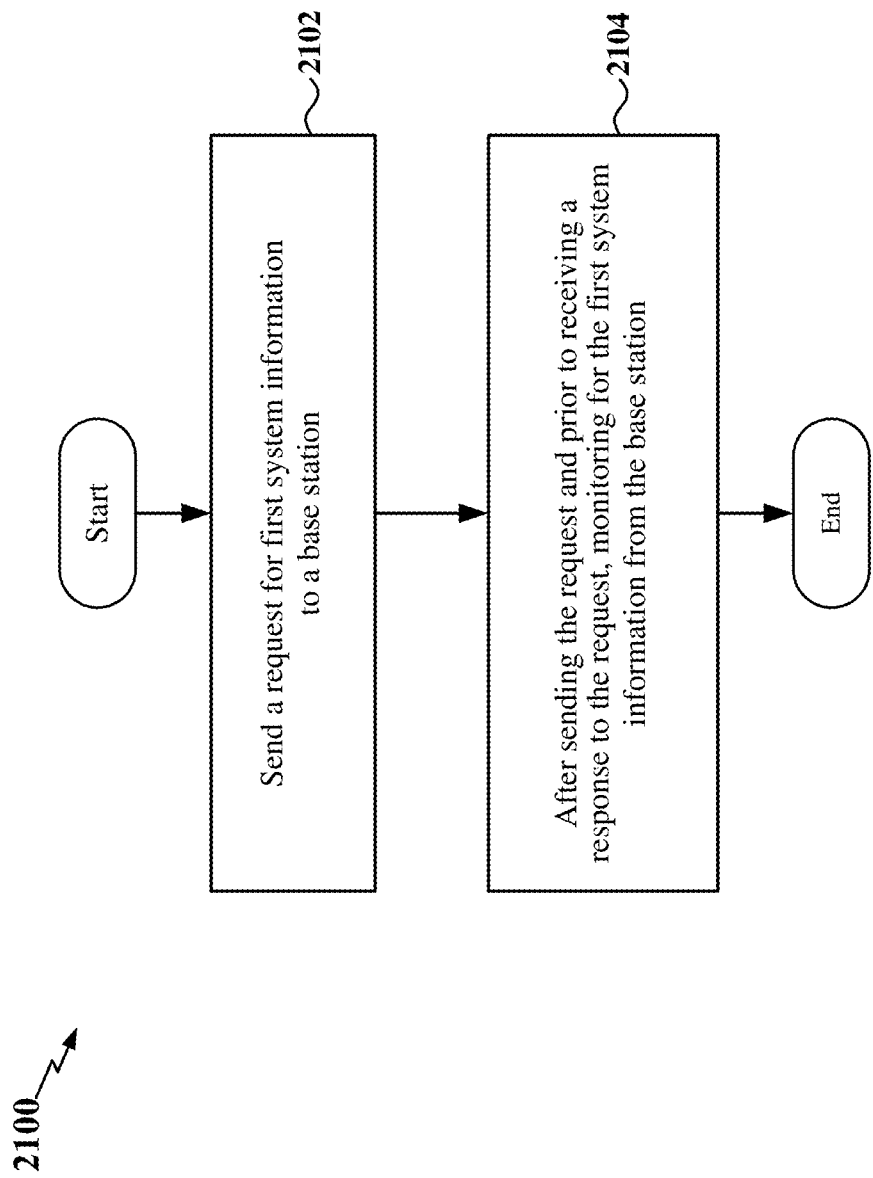
FIG. 21 is a flow chart illustrating an example of a wireless communication process for requesting SI according to some aspects.

FIG. 21 is a flow chart illustrating an example process 2100 for a wireless communication system according to some aspects of the disclosure. As described below, some or all illustrated features may be omitted in a particular implementation within the scope of the disclosure, and some illustrated features may not be required for implementation of all examples. In some examples, the process 2100 may be carried out by one or more of the UE 1700 illustrated in FIG. 17, the UE 106 of FIG. 1, any of the UEs of FIG. 2, the UE 404 of FIG. 4, or the UE 702 of FIG. 7. In some examples, the process 2100 may be carried out by the processing system 1714 of FIG. 17. In some examples, the process 2100 may be carried out by any suitable apparatus or means for carrying out the functions or algorithm described below.

At block 2102, a UE may send a request for first system information to a base station. In some examples, the request may include (e.g., may be) a random access channel (RACH) message. For example, the system information processing circuitry 1744 together with the communication and processing circuitry 1742 and the transceiver 1710, shown and described above in connection with FIG. 17, may transmit a RACH message on a designated RACH resource (e.g., indicated by a RACH configuration), where the RACH message includes an indication requesting SI.

At block 2104, the UE may, after (e.g., as a result of) sending the request and prior to receiving a response to the request, monitor for the first system information from the base station. For example, the system information processing circuitry 1744, together with the communication and processing circuitry 1742 and the transceiver 1710, may proactively monitor a designated resource for SI transmissions by a gNB while waiting for a response to the request.

In some examples, the response to the request may include (e.g., may be) random access response (RAR) message or a contention resolution message. In some examples, monitoring for the first system information may include periodically monitoring for the first system information.

In some examples, the process may further include receiving second system information from the base station after (e.g., as a result of) sending the request and prior to receiving the response to the request, and determining, based on the second system information, whether the first system information is being broadcast by the base station. In some examples, a determination of whether information is being broadcast may include, without limitation, determining whether the information is scheduled for broadcast, determining whether the information is currently being broadcast, or determining whether information is being non-continually broadcast (e.g., a periodic broadcast or an aperiodic broadcast).

In some examples, the process may further include receiving second system information from the base station after (e.g., as a result of) sending the request and prior to receiving the response to the request, determining, based on the second system information, that the first system information is not being broadcast by the base station, and continuing the monitoring for the first system information after (e.g., as a result of) determining, based on the second system information, that the first system information is not being broadcast.

In some examples, the process may further include receiving second system information from the base station after (e.g., as a result of) sending the request and prior to receiving the response to the request, determining, based on the second system information, that the first system information is being broadcast by the base station, terminating the request after (e.g., as a result of) determining, based on the second system information, that the first system information is being broadcast, and continuing the monitoring for the first system information after (e.g., as a result of) determining, based on the second system information, that the first system information is being broadcast. In some examples, the process may further include starting a timer upon continuing the monitoring for the first system information.

In some examples, the process may further include receiving the first system information prior to receiving the response to the request as a result of monitoring for the first system information, terminating the request after (e.g., as a result of) receiving the first system information, and configuring the UE according to the first system information. In some examples, receiving the first system information may include receiving a broadcast message from the base station.

In some examples, the process may further include receiving the response to the request, receiving second system information from the base station after (e.g., as a result of) receiving the response, determining, based on the second system information, that the first system information is being broadcast by the base station, and continuing the monitoring for the first system information after (e.g., as a result of) receiving the response and after (e.g., as a result of) determining, based on the second system information, that the first system information is being broadcast. In some examples, the process may further include starting a timer upon continuing the monitoring for the first system information.

In some examples, the process may further include receiving the response to the request, receiving second system information from the base station after (e.g., as a result of) receiving the response, determining, based on the second system information, that the first system information is not being broadcast by the base station, and continuing the monitoring for the first system information after (e.g., as a result of) receiving the response and after (e.g., as a result of) determining, based on the second system information, that the first system information is not being broadcast. In some examples, the process may further include starting a timer upon continuing the monitoring for the first system information.

In some examples, the first system information may include at least one of cell reselection information, a neighbor cell list, public warning system information, or any combination thereof. In some examples, the first system information may include at least one of intra-frequency neighbor cell information, inter-frequency neighbor cell information, Evolved-Universal Terrestrial Radio Access (E-UTRA) neighbor cell information, or any combination thereof. In some examples, the first system information may include at least one a system information block 3 (SIB3), a system information block 4 (SIB4), a system information block 5 (SIB5), a system information block 6 (SIB6), a system information block 7 (SIB7), a system information block 8 (SIB8), a system information block 9 (SIB9), or any combination thereof.

Figure 22:
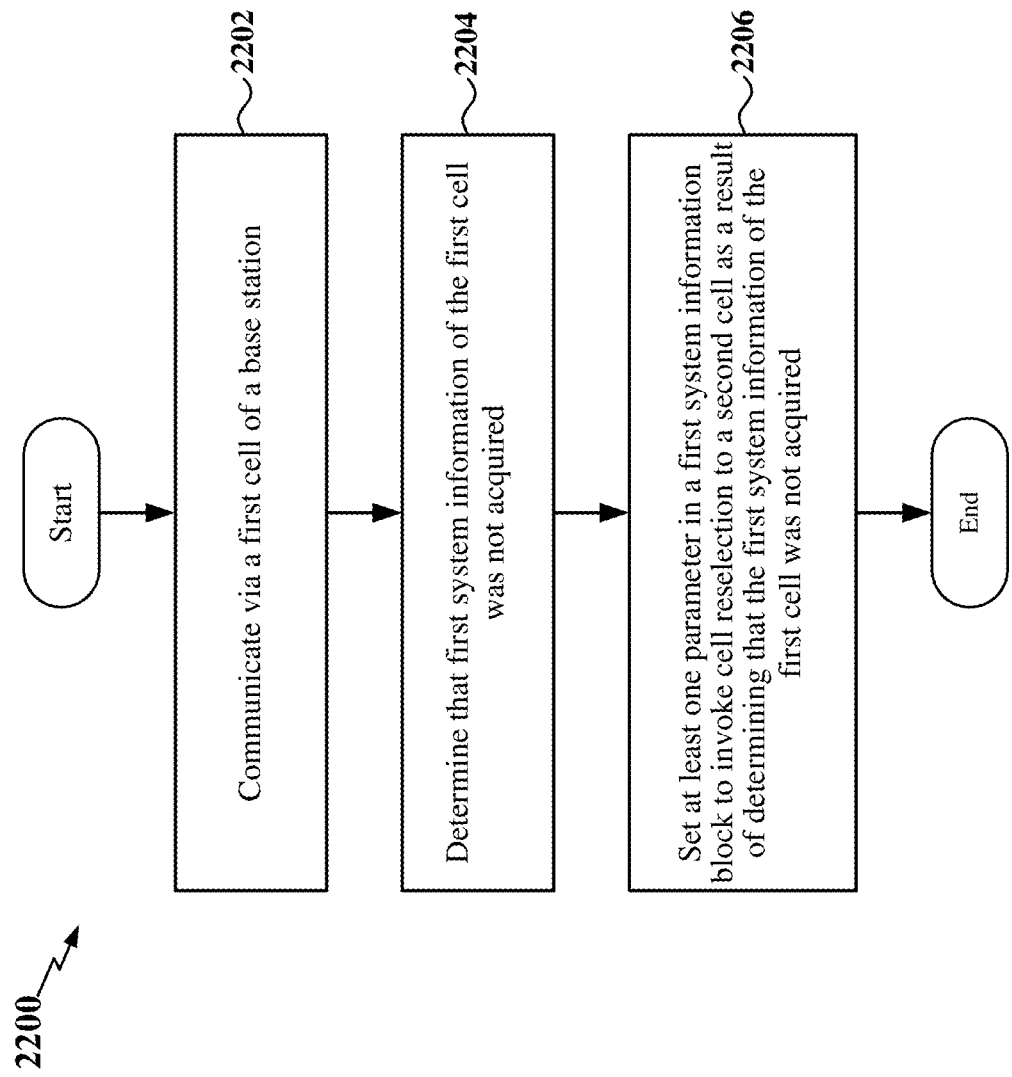
FIG. 22 is a flow chart illustrating another example of a wireless communication process for setting a parameter of SI according to some aspects.

FIG. 22 is a flow chart illustrating an example process 2200 for a wireless communication system according to some aspects of the disclosure. As described below, some or all illustrated features may be omitted in a particular implementation within the scope of the disclosure, and some illustrated features may not be required for implementation of all examples. In some examples, the process 2200 may be carried out by one or more of the UE 1700 illustrated in FIG. 17, the UE 106 of FIG. 1, any of the UEs of FIG. 2, the UE 404 of FIG. 4, or the UE 702 of FIG. 7. In some examples, the process 2200 may be carried out by the processing system 1714 of FIG. 17. In some examples, the process 2200 may be carried out by any suitable apparatus or means for carrying out the functions or algorithm described below.

At block 2202, a UE may communicate via a first cell of a base station. For example, the communication and processing circuitry 1742 and the transceiver 1710, shown and described above in connection with FIG. 17, may transmit information to a gNB via allocated uplink resources and receive information from the gNB via allocated downlink resources.

At block 2204, the UE may determine that first system information of the first cell was not acquired. For example, the system information processing circuitry 1744 together with the communication and processing circuitry 1742 and the transceiver 1710, shown and described above in connection with FIG. 17, may attempt to acquire SI by monitoring a designated resource (e.g., a PBCH resource) for SI transmissions by a gNB. In some examples, determining that the first system information of the cell was not acquired may include determining that second system information of the cell does not include scheduling information for the first system information. In some examples, determining that the first system information of the cell was not acquired may include determining that a timer associated with acquisition of the first system information expired. In some examples, determining that the first system information of the cell was not acquired may include determining that a random access procedure for acquiring the first system information failed.

At block 2206, the UE may set at least one parameter in a first system information block to invoke cell reselection to a second cell as a result of determining that the first system information of the first cell was not acquired. In some examples, setting the at least one parameter may include setting a serving layer parameter to a lowest priority of a plurality of priorities. In some examples, setting the at least one parameter may include setting a Treselection parameter to 0. For example, the mobility processing circuitry 1746 shown and described above in connection with FIG. 17, may, in response to an indication from the system information processing circuitry 1744 that SI was not acquired, set the Treselection parameter to a value of 0.

In some examples, the first system information block may include a default system information block. In some examples, the first system information may include a system information block 2 (SIB2). In some examples, the first system information block may include a default SIB2.

In some examples, the first system information may include at least one of cell reselection information, a neighbor cell list, public warning system information, or any combination thereof. In some examples, the first system information may include at least one of intra-frequency neighbor cell information, inter-frequency neighbor cell information, Evolved-Universal Terrestrial Radio Access (E-UTRA) neighbor cell information, or any combination thereof. In some examples, the first system information may include at least one a system information block 3 (SIB3), a system information block 4 (SIB4), a system information block 5 (SIB5), a system information block 6 (SIB6), a system information block 7 (SIB7), a system information block 8 (SIB8), a system information block 9 (SIB9), or any combination thereof.

In some examples, the process may further include barring reselection to the first cell for a period of time after (e.g., as a result of) determining that the first system information of the cell was not acquired.

The following provides an overview of several aspects of the present disclosure.

Aspect 1: A method for wireless communication at a user equipment, the method comprising: monitoring for first system information; after a limit for the monitoring for the first system information has been reached, determining that the first system information was not received; and conducting a failure procedure after determining that the first system information was not received.

Aspect 2: The method of aspect 1, wherein: the limit is based on a type of the first system information; and the failure procedure is based on the type of the first system information.

Aspect 3: The method of aspect 1 or 2, wherein the limit comprises a time limit or a count.

Aspect 4: The method of any of aspects 1 through 3, further comprising: determining a type of the first system information; and selecting the limit from a plurality of limits based on the type of the first system information, wherein the plurality of limits comprise a first time limit for a first type of system information and a second time limit for a second type of system information.

Aspect 5: The method of aspect 4, wherein: the first time limit comprises a multiple of a system information periodicity; the second time limit comprises a maximum value selected from a first value and a second value; the first value comprises a multiple of the system information periodicity; and the second value comprises a multiple of a discontinuous reception (DRX) cycle length.

Aspect 6: The method of any of aspects 1 through 5, wherein: the limit comprises a time limit; the method further comprises starting a timer in conjunction with commencing the monitoring for the first system information; and determining that the first system information was not received comprises determining that the first system information was not received prior to expiration of the timer.

Aspect 7: The method of any of aspects 1 through 6, wherein: the limit comprises a count; the method further comprises starting a counter in conjunction with commencing the monitoring for the first system information; and determining that the first system information was not received comprises determining that the first system information was not received prior to the counter reaching the count.

Aspect 8: The method of any of aspects 1 through 7, wherein: the limit comprises a count; the method further comprises determining a type of the first system information; the method further comprises selecting the count from a plurality of counts based on the type of the first system information; and the plurality of counts comprise a first count for a first type of system information and a second count for a second type of system information.

Aspect 9: The method of any of aspects 1 through 8, further comprising: determining a type of the first system information; and selecting the failure procedure from a plurality of failure procedures based on the type of the first system information, wherein the plurality of failure procedures comprises a first failure procedure for a first type of system information and a second failure procedure for a second type of system information.

Aspect 10: The method of aspect 9, wherein: the first failure procedure comprises initiating a radio link failure and the second failure procedure comprises immediate cell reselection; or the first failure procedure comprises barring reselection to a cell for a period of time and the second failure procedure comprises immediate cell reselection.

Aspect 11: The method of any of aspects 1 through 10, wherein: the limit is based on a discontinuous reception (DRX) cycle length multiplied by a parameter; and the method further comprises determining whether second system information has been received, and setting the parameter to a particular value after determining whether the second system information has been received.

Aspect 12: The method of any of aspects 1 through 11, wherein: the limit is based on a discontinuous reception (DRX) cycle length multiplied by a parameter; and the method further comprises determining whether the user equipment has received a synchronization signal block measurement time configuration (SMTC), and setting the parameter to a particular value after determining whether an SMTC field is present.

Aspect 13: The method of any of aspects 1 through 12, further comprising communicating via a first cell of a base station; and setting at least one parameter in a first system information block to invoke cell reselection to a second cell as a result of the determination that the first system information was not received.

Aspect 15: The method of aspect 14, wherein: the at least one parameter comprises a serving layer parameter; and the method further comprises setting the serving layer parameter to a lowest priority of a plurality of priorities as a result of the determination that the first system information was not received.

Aspect 16: The method of any of aspects 14 through 15, wherein: the at least one parameter comprises a Treselection parameter; and the method further comprises setting the Treselection parameter to 0 as a result of the determination that the first system information was not received.

Aspect 17: The method of any of aspects 14 through 16, wherein: the at least one parameter comprises a cell reselection priority; and the method further comprises setting the cell reselection priority based on at least one cell reselection priority that the user equipment acquired when camping on at least one cell other than the first cell.

Aspect 18: The method of any of aspects 14 through 17, further comprising: barring reselection to the first cell for a period of time after the determination that the first system information was not received.

Aspect 19: The method of any of aspects 14 through 18, wherein the first system information comprises a default system information block, a system information block 2 (SIB2), or a default SIB2.

Aspect 20: The method of any of aspects 14 through 19, wherein the determination that the first system information was not received comprises at least one of: a determination that second system information of the first cell does not include scheduling information for the first system information, a determination that a timer associated with acquisition of the first system information expired, a determination that a random access procedure for acquiring the first system information failed, or a combination thereof.

Aspect 21: A method for wireless communication at a user equipment, the method comprising: sending a request for first system information to a base station; and after sending the request and prior to receiving a response to the request, monitoring for the first system information from the base station.

Aspect 22: The method of aspect 21, wherein: the request comprises a random access channel (RACH) message; and the response to the request comprises random access response (RAR) message or a contention resolution message.

Aspect 23: The method of any of aspects 21 through 22, wherein monitoring for the first system information comprises periodically monitoring for the first system information.

Aspect 24: The method of any of aspects 21 through 23, further comprising: receiving second system information from the base station after sending the request and prior to receiving the response to the request; and determining, based on the second system information, whether the first system information is being broadcast by the base station.

Aspect 25: The method of any of aspects 21 through 24, further comprising: receiving second system information from the base station after sending the request and prior to receiving the response to the request; determining, based on the second system information, that the first system information is not being broadcast by the base station; and continuing the monitoring for the first system information after determining, based on the second system information, that the first system information is not being broadcast.

Aspect 26: The method of any of aspects 21 through 25, further comprising: receiving second system information from the base station after sending the request and prior to receiving the response to the request; determining, based on the second system information, that the first system information is being broadcast by the base station; terminating the request after determining, based on the second system information, that the first system information is being broadcast; and continuing the monitoring for the first system information after determining, based on the second system information, that the first system information is being broadcast.

Aspect 28: The method of any of aspects 21 through 27, further comprising: receiving the first system information prior to the receipt of the response to the request as a result of monitoring for the first system information; terminating the request after the receipt of the first system information; and configuring the user equipment according to the first system information.

Aspect 29: The method of any of aspects 21 through 28, further comprising: receiving the response to the request; receiving second system information from the base station after the receipt of the response; determining, based on the second system information, that the first system information is being broadcast by the base station; and continuing to monitor for the first system information after the receipt of the response and after the determination, based on the second system information, that the first system information is being broadcast.

Aspect 30: The method of any of aspects 21 through 29, further comprising: receiving the response to the request; receiving second system information from the base station after the receipt of the response; determining, based on the second system information, that the first system information is not being broadcast by the base station; and continuing to monitor for the first system information after the receipt of the response and after the determination, based on the second system information, that the first system information is not being broadcast.

Aspect 31: A user equipment (UE) comprising: a transceiver configured to communicate with a radio access network, a memory, and a processor communicatively coupled to the transceiver and the memory, wherein the processor and the memory are configured to perform any one of aspects 1 through 20.

Aspect 32: An apparatus configured for wireless communication comprising at least one means for performing any one of aspects 1 through 20.

Aspect 33: A non-transitory computer-readable medium storing computer-executable code, comprising code for causing an apparatus to perform any one of aspects 1 through 20.

Aspect 34: A user equipment (UE) comprising: a transceiver configured to communicate with a radio access network, a memory, and a processor communicatively coupled to the transceiver and the memory, wherein the processor and the memory are configured to perform any one of aspects 21 through 30.

Aspect 35: An apparatus configured for wireless communication comprising at least one means for performing any one of aspects 21 through 30.

Aspect 36: A non-transitory computer-readable medium storing computer-executable code, comprising code for causing an apparatus to perform any one of aspects 21 through 30.

In some examples, the disclosure provides a user equipment that includes a transceiver, a memory, and a processor communicatively coupled to the transceiver and the memory. The processor and the memory may be configured to, after the user equipment enters coverage of a cell of a base station, determine that a quantity of paging occasions remaining for the user equipment during a period of time is less than or equal to a threshold. The processor and the memory may also be configured to monitor for system information via the transceiver after the determination that the quantity of paging occasions remaining for the user equipment during the period of time is less than or equal to the threshold.

In some examples, the disclosure provides a method for wireless communication at a user equipment. The method may include, after the user equipment enters coverage of a cell of a base station, determining that a quantity of paging occasions remaining for the user equipment during a period of time is less than or equal to a threshold. The method may also include monitoring for system information after determining that the quantity of paging occasions remaining for the user equipment during the period of time is less than or equal to the threshold.

In some examples, the disclosure provides a user equipment. The user equipment may include means for determining, after the user equipment enters coverage of a cell of a base station, that a quantity of paging occasions remaining for the user equipment during a period of time is less than or equal to a threshold, and means for monitoring for system information after determining that the quantity of paging occasions remaining for the user equipment during the period of time is less than or equal to the threshold.

In some examples, the disclosure provides an article of manufacture for use by a user equipment. The article of manufacture may include a computer-readable medium having stored therein instructions executable by one or more processors of the user equipment to after the user equipment enters coverage of a cell of a base station, determine that a quantity of paging occasions remaining for the user equipment during a period of time is less than or equal to a threshold, and monitor for system information after the determination that the quantity of paging occasions remaining for the user equipment during the period of time is less than or equal to the threshold.

Several aspects of a wireless communication network have been presented with reference to example implementations. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-22 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in FIGS. 1, 2, 4, 7, and 17 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method for wireless communication at a user equipment, the method comprising:
    monitoring for first system information;
    after a limit for the monitoring for the first system information has been reached, determining that the first system information was not received;
    determining a type of the first system information;
    determining a connection state of the user equipment;
    selecting a failure procedure from a plurality of failure procedures based on the type of the first system information and the connection state, the plurality of failure procedures comprising: a cell barring procedure associated with a first type of connection state, a radio link failure procedure associated with a second type of connection state, or an immediate reselection procedure associated with the first type of connection state, the first type of connection state being different from the second type of connection state; and
    conducting the selected failure procedure after determining that the first system information was not received.

2. The method of claim 1, wherein:
    the limit is based on the type of the first system information.

3. The method of claim 1, wherein the limit comprises a time limit or a count.

4. The method of claim 1, further comprising:
    selecting the limit from a plurality of limits based on the type of the first system information, wherein the plurality of limits comprises a first time limit for a first type of system information and a second time limit for a second type of system information.

5. The method of claim 4, wherein:
the first time limit comprises a multiple of a system information periodicity;
the second time limit comprises a maximum value selected from a first value and a second value;
the first value comprises a multiple of the system information periodicity; and
the second value comprises a multiple of a discontinuous reception (DRX) cycle length.

6. The method of claim 1, wherein:
the limit comprises a time limit;
the method further comprises starting a timer in conjunction with commencing the monitoring for the first system information; and
determining that the first system information was not received comprises determining that the first system information was not received prior to expiration of the timer.

7. The method of claim 1, wherein:
the limit comprises a count;
the method further comprises starting a counter in conjunction with commencing the monitoring for the first system information; and
determining that the first system information was not received comprises determining that the first system information was not received prior to the counter reaching the count.

8. The method of claim 1, wherein:
the limit comprises a count;
the method further comprises selecting the count from a plurality of counts based on the type of the first system information; and
the plurality of counts comprises a first count for a first type of system information and a second count for a second type of system information.

9. The method of claim 1, wherein, when the user equipment is not in a connected state, the plurality of failure procedures comprises barring the cell for a period of time for a first type of system information and initiating immediate reselection for a second type of system information.

10. The method of claim 1, wherein, when the user equipment is in a connected state, the plurality of failure procedures comprises a radio link failure procedure or an immediate cell reselection procedure for a first type of system information and remaining on the cell for a second type of system information.

11. The method of claim 1, wherein:
the limit is based on a discontinuous reception (DRX) cycle length multiplied by a parameter; and
the method further comprises determining whether second system information has been received, and setting the parameter to a particular value after determining whether the second system information has been received.

12. The method of claim 1, wherein:
the limit is based on a discontinuous reception (DRX) cycle length multiplied by a parameter; and
the method further comprises determining whether the user equipment has received a synchronization signal block measurement time configuration (SMTC), and setting the parameter to a particular value after determining whether an SMTC field is present.

13. A user equipment, comprising:
a transceiver;
one or more memories storing processor-executable code; and
one or more processors configured to execute the processor-executable code to cause the user equipment to:
monitor for first system information via the transceiver;
after a limit for the monitoring for the first system information has been reached, determine that the first system information was not received;
determine a type of the first system information;
determine a connection state of the user equipment;
select a failure procedure from a plurality of failure procedures based on the type of the first system information and the connection state, the plurality of failure procedures comprising: a cell barring procedure associated with a first type of connection state, a radio link failure procedure associated with a second type of connection state, or an immediate reselection procedure associated with the first type of connection state, the first type of connection state being different from the second type of connection state; and
conduct the selected failure procedure after the determination that the first system information was not received.

14. The user equipment of claim 13, wherein the one or more processors are further configured to execute the processor-executable code to cause the user equipment to:
communicate via a first cell of a base station; and
set at least one parameter in a first system information block to invoke cell reselection to a second cell as a result of the determination that the first system information was not received.

15. The user equipment of claim 14, wherein:
the at least one parameter comprises a serving layer parameter; and
the one or more processors are further configured to execute the processor-executable code to cause the user equipment to set the serving layer parameter to a lowest priority of a plurality of priorities as a result of the determination that the first system information was not received.

16. The user equipment of claim 14, wherein:
the at least one parameter comprises a Treselection parameter; and
the one or more processors are further configured to execute the processor-executable code to cause the user equipment to set the Treselection parameter to 0 as a result of the determination that the first system information was not received.

17. The user equipment of claim 14, wherein:
the at least one parameter comprises a cell reselection priority; and
the one or more processors are further configured to execute the processor-executable code to cause the user equipment to set the cell reselection priority based on at least one cell reselection priority that the user equipment acquired when camping on at least one cell other than the first cell.

18. The user equipment of claim 14, wherein the one or more processors are further configured to execute the processor-executable code to cause the user equipment to:
bar reselection to the first cell for a period of time after the determination that the first system information was not received.

19. The user equipment of claim 14, wherein the first system information comprises a default system information block, a system information block 2 (SIB2), or a default SIB2.

20. The user equipment of claim 14, wherein the determination that the first system information was not received comprises at least one of: a determination that second system information of the first cell does not include scheduling information for the first system information, a determination that a timer associated with acquisition of the first system information expired, a determination that a random access procedure for acquiring the first system information failed, or a combination thereof.

* * * * *